United States Patent
Arnicar et al.

(10) Patent No.: US 11,566,912 B1
(45) Date of Patent: Jan. 31, 2023

(54) CAPTURING FEATURES FOR DETERMINING ROUTES

(71) Applicant: Zoox, Inc., Foster City, CA (US)

(72) Inventors: Taylor Andrew Arnicar, Sunnyvale, CA (US); Christopher James Gibson, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 261 days.

(21) Appl. No.: 16/904,733

(22) Filed: Jun. 18, 2020

(51) Int. Cl.
*G01C 21/34* (2006.01)
*G08G 1/0968* (2006.01)
*G06F 8/65* (2018.01)
*B60W 60/00* (2020.01)
*G06V 20/58* (2022.01)

(52) U.S. Cl.
CPC ..... *G01C 21/3492* (2013.01); *B60W 60/0021* (2020.02); *G06F 8/65* (2013.01); *G06V 20/584* (2022.01); *G08G 1/096822* (2013.01)

(58) Field of Classification Search
CPC .. G01C 21/3492; B60W 60/0021; G06F 8/65; G06V 20/584; G08G 1/096822
See application file for complete search history.

(56) References Cited

U.S. PATENT DOCUMENTS

| 11,222,299 | B1 * | 1/2022 | Baalke | G06Q 10/087 |
| 2017/0227966 | A1 * | 8/2017 | Monzen | B62D 15/0255 |
| 2017/0277716 | A1 * | 9/2017 | Giurgiu | G01C 21/32 |
| 2018/0061232 | A1 | 3/2018 | Madigan et al. | |
| 2019/0113927 | A1 * | 4/2019 | England | G05D 1/0221 |
| 2019/0146508 | A1 * | 5/2019 | Dean | G05D 1/0285 701/26 |
| 2019/0278273 | A1 | 9/2019 | Behrendt et al. | |
| 2020/0026722 | A1 * | 1/2020 | Eade | G06T 7/12 |
| 2020/0132477 | A1 * | 4/2020 | Averilla | G01C 21/32 |
| 2020/0135015 | A1 * | 4/2020 | Kalabic | G08G 1/0133 |
| 2021/0364305 | A1 * | 11/2021 | Rizk | G06V 20/588 |

FOREIGN PATENT DOCUMENTS

WO    WO-2018005819 A1 *  1/2018  ............ B60W 10/04

OTHER PUBLICATIONS

Office Action for U.S. Appl. No. 16/904,768, dated Sep. 7, 2021, Arnicar, "Determining Routes Based On Captured Features", 50 pages.
Office Action for U.S. Appl. No. 16/904,768, dated Mar. 18, 2022, Arnicar, "Determining Routes Based On Captured Features", 32 pages.

* cited by examiner

*Primary Examiner* — Mary Cheung
(74) *Attorney, Agent, or Firm* — Lee & Hayes, P.C.

(57) ABSTRACT

Techniques for determining a location and type of traffic-related features and using such features in route planning are discussed herein. The techniques may include determining that sensor data represents a feature such as a traffic light, road segment, building type, and the like. The techniques further include determining a cost of a feature, whereby the cost is associated with the effect of a feature on a vehicle traversing an environment. A feature database can be updated based on features in the environment. A cost of the feature can be used to update costs of routes associated with the location of the feature.

20 Claims, 11 Drawing Sheets

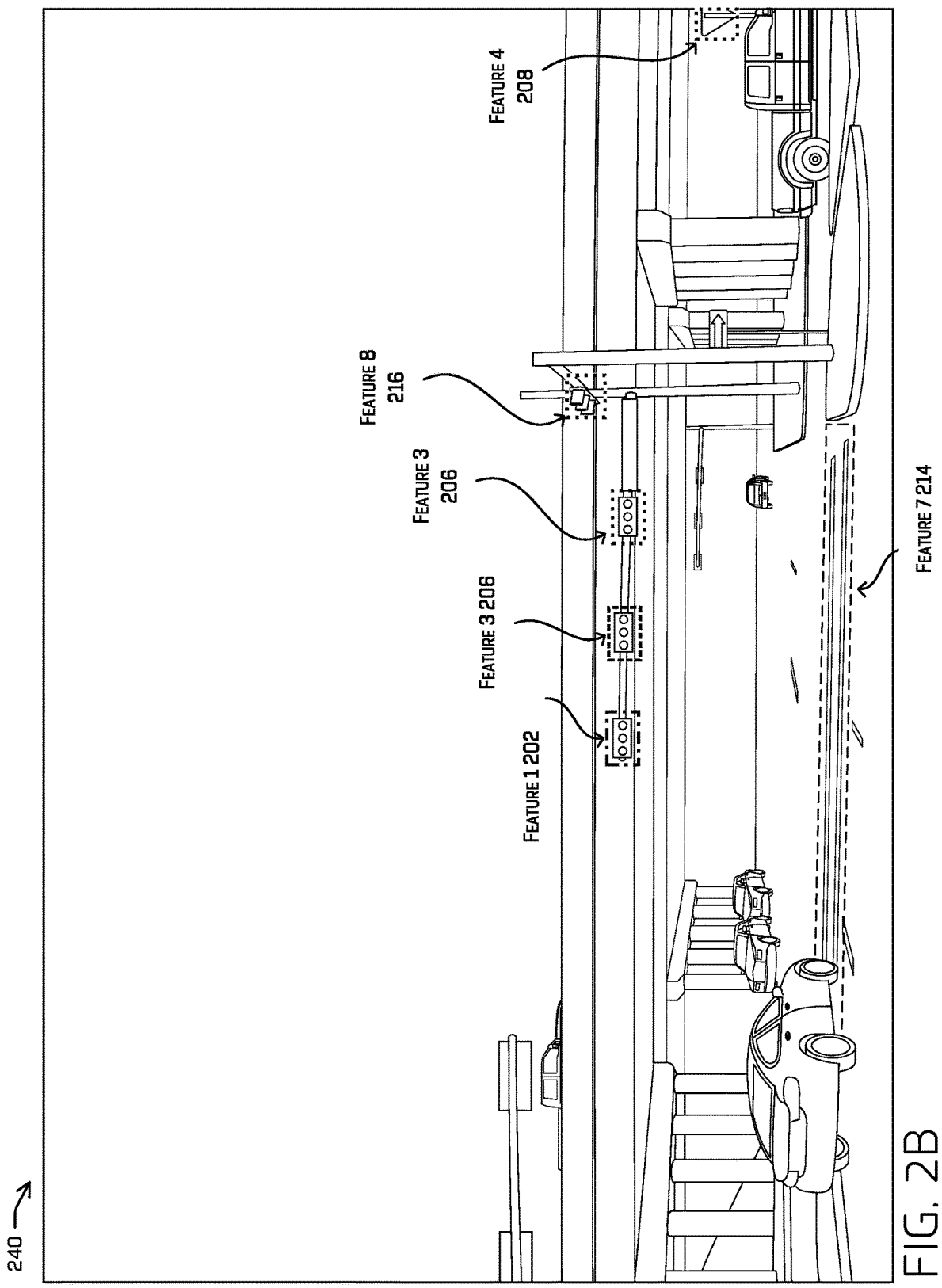

| ID | 123 |
|---|---|
| Class | Traffic Light |
| Resolved | Yes |
| Type | Active |
| Timing | 30 Second Green 90 Second Red |
| Cost Min | 25 |
| Cost Max | 60 |
| Group | 2333 |
| Group Effect | Reduce Cost of Other Features in Group by 90% |
| Heavy Traffic Cost | 90 |
| Heavy Traffic Effect | Ignore Group Effect |
| Active Tracking | Yes |
| Current Status | Red 15 seconds ago |

FIG. 5A

| ID | 124 |
|---|---|
| Class | Forced Merger |
| Resolved | No |
| Type | Static |
| Timing | N/A |
| Cost Min | 15 |
| Cost Max | 60 |
| Group | N/A |
| Group Effect | N/A |
| Heavy Traffic Cost | 180 |
| Heavy Traffic Effect | N/A |
| Active Tracking | N/A |
| Current Status | N/A |

FIG. 5B

CAPTURING FEATURES FOR DETERMINING ROUTES

BACKGROUND

Various methods, apparatuses, and systems are utilized by autonomous vehicles to guide such autonomous vehicles through environments including various static and dynamic objects and features. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons. An autonomous vehicle may also encounter a variety of features like traffic controls, such as stop signs, traffic lights, pedestrian crossings, train crossings, and the like, which may affect how the vehicle traverses the environment. Determining a route for the autonomous vehicle to reach its destination may present challenges.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIGS. 2A-2C illustrate a series of images of an intersection captured at different times and an example of detecting and monitoring features in the series of images, in accordance with examples of the disclosure.

FIG. 5A illustrates an example feature database entry for an active feature, in accordance with examples of the disclosure.

FIG. 5B illustrates an example feature database entry for a static feature, in accordance with examples of the disclosure.

DETAILED DESCRIPTION

Figure 1:
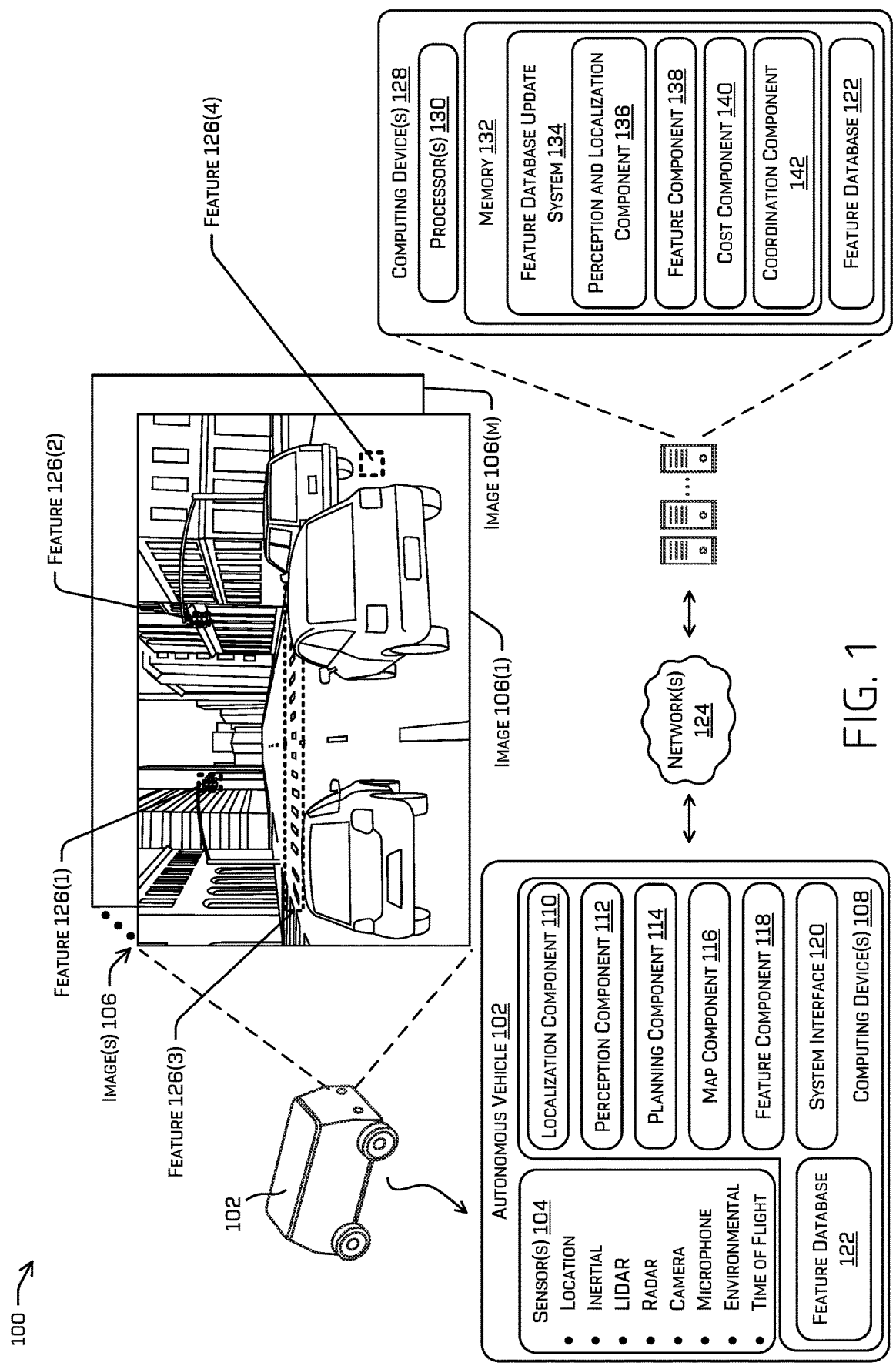
FIG. 1 illustrates an example autonomous vehicle system that detects features in an environment, updates a feature database using information about the detected features, and performs route planning based at least in part on the feature database, in accordance with examples of the disclosure.

This disclosure is directed to systems and techniques for capturing or determining information about semantic features (such as traffic-related features), for example, that are used by vehicles to plan routes while navigating within an environment. Further, this disclosure is directed to systems and techniques for planning routes for vehicles navigating in an environment based at least in part on features. Some example features (which may be semantic features, for instance) may include traffic lights, road signs, crosswalks, speed bumps, hills, road damage (e.g., pot holes, washboards, etc.), lane merges, unprotected left turns, school zones, rail crossings, lane restrictions (e.g., HOV, express, or time of day restricted lanes), traffic inlets/outlets (e.g., parking lot or parking garage exits), highway on-ramps, off-ramps, passing restrictions (e.g., either in same direction traffic or passing using opposite direction of travel lanes), presence or absence of center of road turn lane, presence or absence of civic buildings, a drawbridge; industrial or technology campuses, shopping centers or the like, and any other feature that may impact travel or route desirability (e.g., an amount of time required to traverse the route, a length of the route, noise along the route, safety along the route, etc.).

For example, systems and techniques according to this disclosure may allow for updating a feature database of the environment based on sensor data acquired by a vehicle utilizing a current version of the feature database (e.g., image data or other sensor data). Sensor data acquired by the vehicle utilizing the current version of the feature database may be analyzed and flagged, for example, by the onboard computer of the vehicle or an off-vehicle computer when vehicle data is post processed when (1) a feature detected in the sensor data does not correspond to a feature in the feature database or (2) a feature detected in the sensor data appears to correspond to a feature in the feature database but is designated as unresolved (e.g., a features for which additional information is sought) or as an active feature (e.g., a feature that changes over time such as a traffic light or lane closure signal). The flagged sensor data may be provided to a feature database update system, which may be part of a central control system, which may operate to analyze the sensor data and update the feature database. The discussion herein primarily discusses images for ease of understanding and to avoid unnecessary complexity in illustration, but it is contemplated that the techniques may be applied to any sensor data that has the capability to represent a feature (e.g., a point cloud including points that represent an object).

In some examples, a perception component of the feature database update system may detect a feature in the flagged sensor data. The detected feature may be compared to feature database entries in the feature database. The feature database update system may then determine if the detected feature (1) does not correspond to a feature in the feature database or (2) appears to correspond to a feature in the feature database but is designated as unresolved (e.g., for which additional information is sought) or as an active feature (e.g., a feature that changes over time such as a traffic light or lane closure signal).

In the case that the detected feature does not appear in the feature database or appears to correspond to a feature in the feature database but is designated as unresolved or as an active feature, the feature database update system may add or update a feature database entry associated with the detected feature.

For example, the detected feature may be analyzed over multiple frames (e.g., multiple frames of video or multiple still image frames) and the feature database update system may add or update a feature database entry associated with the detected feature based on the analysis.

In some examples, a feature component of the feature database update system may classify the detected feature and determine pertinent information for the detected feature. For example, the feature component may determine a classification or feature class of the feature. As mentioned above, some example features and/or feature classes may include traffic lights, road signs, crosswalks, speed bumps, hills, road damage (e.g. pot holes, washboards, etc.), lane merges, unprotected left turns, school zones, rail crossings, lane restrictions (e.g., HOV, express, or time of day restricted lanes), traffic inlets/outlets (e.g., parking lot or parking garage exits), highway on-ramps, off-ramps, passing restrictions (e.g., either in same direction traffic or passing using opposite direction of travel lanes), presence or absence of center of road turn lane, presence or absence of civic buildings, industrial or technology campuses, shopping centers or the like, and any other feature that may impact travel or route desirability.

The feature component may further designate features as active or static features. As used herein, an active feature may be a feature that changes state over time. For example, active features may include traffic lights, rail crossings, lane restrictions or closures from traffic accidents or traffic congestion or so on. Static features may be features that may not change state over time. For example, static features may include road signs, crosswalks, speed bumps, hills, lane merges, unprotected left turns and so on. The designation of whether some classes of features are active or passive may vary from example to example. For example, features that change state based on time of day, such as school zones, may be treated as static features with different effects depending on time of day or as active features. Similarly, a rail road crossing may be treated as a static feature or an active feature. Active features may be tracked or monitored by a coordination component of the feature database update system and updated to autonomous vehicles over time. For example, the timing of a traffic light feature may be determined over time and the current state of the traffic light may be updated and maintained as autonomous vehicles provide observations. Static features may not be monitored or updated in regular operation of the feature database update system once resolved in the database (as discussed in more detail below).

The feature component may further designate features as resolved or unresolved. As used herein, an unresolved feature may be a feature whose feature database entry is being refined by the feature database update system (e.g., other than monitoring active features for active feature changes). For example, after a first detection of a speed bump in a first set of sensor data, the feature component may generate a feature database entry including parameters of the speed bump that may be approximated based on the sample set provided (e.g., the approximate height, width and position of the speed bump may have errors due to the limited sample set). The feature component may designate the feature database entry for the speed bump as unresolved such that the parameters are refined based on future observations by autonomous vehicles.

In another example, a traffic light may be observed over time to refine a timing pattern of the traffic light (e.g., green for 30 seconds then red for 90 seconds or green until a vehicle approaches on the crossing road, 20 seconds before changing to red, then 60 seconds before going green again). In some examples, the feature component may also resolve changes in patterns over time (e.g., time of day, day of week, etc.).

Once the feature parameters have been refined, for example, to within an acceptable margin of error (e.g., as may be confirmed based on additional observations), the feature may be designated as resolved and the feature component may not perform further analysis for static features or for active features other than monitoring active changes.

The feature component may also designate links or groupings among features. Linked features or grouped features may have group effects assigned thereto which may affect the cost or weight of the grouped features in some scenarios. For example, a set of traffic lights may be observed to have a linked timing such that vehicles leaving a green light at a first traffic light in the set will, under some determined set of traffic conditions, arrive at the subsequent lights in the set while the subsequent lights are green. In such a case, the cost or weight of the traffic lights after the first may be reduced due to the high likelihood the subsequent lights will not have an impact on the travel time of the autonomous vehicle (e.g., because the lights will already be green as the autonomous vehicle reaches and passes the lights). In some examples, features may be part of any number of groups or links or not part of any group or link.

The feature component may also analyze and designate heavy traffic effects on the features. For example, the effect of a forced lane merge on travel times through a section of road may be minimal during light traffic but result in severe slowdowns and congestion when traffic is heavy. Traffic may vary without regard to time of day. As such, some systems may implement or determine heavy traffic effects because time of day based differentiation may not capture or address such heavy traffic effects. In some examples, the heavy traffic effects may impact other parameters of the feature. For example, the group effects assigned to a group of features may be modified by heavy traffic effects. In some examples, heavy traffic may disrupt the synchronization of a group of traffic lights whose timing is synchronized to allow an autonomous vehicle starting from a first light as it turns green to arrive at subsequent lights while the subsequent lights are already green under normal traffic conditions. Under such heavy traffic conditions, the group effect of reducing the cost or weight of the subsequent lights may be disabled such that each light is given its full cost or weight. In other words, because the synchronization is disrupted, the vehicle may not reach subsequent lights while those lights are green. As such, no weight or cost reduction may be applied.

A cost component of the feature database update system may determine a cost (also referred to herein as a weight) for the detected feature (e.g., based on parameters of the feature). Depending on the implementation, the cost or weight for features may take various forms and be determined differently. In some examples, the cost may be a time factor or a value indicating a relative amount of time the feature may add to a route's travel time. Other considerations may be factored into the cost. For example, the cost may factor in comfort such as by increasing the cost for features that may jostle passengers (e.g., speed bumps, pot holes, low water crossings, rail crossings, etc.) or subject the passengers to larger lateral accelerations (e.g., sharp corners, turns, etc.). Many other factors may be considered.

In some examples, the cost component may determine and/or refine the cost or weight (hereinafter cost) of features over multiple observations by autonomous vehicles. An initial, or default, cost for the feature may be determined based on the feature class. The default cost may be adapted based on the parameters of the feature. The cost may be further adapted based on the current and future observations of the feature by autonomous vehicles and the observed effect of the feature on travel during those observations.

In some examples, the cost component of the feature database update system may provide the cost of a feature as a range of values. For example, a cost of a feature may specify a minimum cost and a maximum cost for the feature. In an example, a forced lane merge may have a range of costs during normal traffic from no impact on travel time to a moderate increase in travel time. More particularly, such a range of costs may indicate that the forced lane merge may have no impact or cause a moderate increase in travel time under normal travel conditions.

In some examples, the cost component may designate different costs for a feature during different periods of the day. For example, the cost for a school zone may be represented as two ranges, one for times during school zone hours and one for times outside of the school zone hours, and the cost component may analyze and designate costs for the school zone feature based on observations from the associated periods of time.

Further, the cost component of the feature database update system may designate heavy traffic costs for features. In addition to changing how features may impact travel along routes, heavy traffic may affect the simple magnitude of any slowdowns or increased travel time. For example, under normal traffic conditions, a forced lane merge feature may have a range of costs from none to moderate but, under heavy traffic conditions, the forced lane merge feature may impose a heavy cost or slowdown far in excess of its normal range of costs by creating congestion. Accordingly, the cost component may designate a separate heavy traffic cost to reflect the cost of the feature under heavy traffic conditions.

Some examples may include features and feature costs reflective of concerns other than or in addition to travel concerns along potential routes. For example, some features may raise or lower the desirability of various drop off points at a destination. In an example, some features (e.g., alleyways, low water crossings, drainage areas, and access locked areas) are not desirable drop off points and reduce the desirability of being dropped off in close proximity to those features. Such features and feature costs may be taken into consideration when planning routes. As such, a route with a low feature cost along the travel path but which includes a drop off point at the destination in a back alley drainage area with no public access to the building at the destination address may be discarded in favor of a route with a higher cost along the travel path but with a drop off point at a front entrance of the building at the destination address.

The feature component may use the costs determined by the cost component to update feature database entries in the feature database.

In addition to the above operations, the feature component may determine whether parameters of a feature have been resolved. As noted above, the parameters of a speed bump feature may not be fully resolved after a first observation by an autonomous vehicle (e.g., the height, width, depth or other parameter of the speed bump may have an unacceptably high margin of error). Designating the feature as unresolved may result in subsequent updates based on future observations. The feature component may determine that the parameters of the feature are within an acceptable margin of error (e.g., based on the additional observations from one or more vehicles in a fleet of vehicles) and, based on such a determination, designate the feature as resolved. Thereafter, in some implementations, the feature database update component may not perform updates for the resolved feature other than to monitor active feature changes (e.g., the current state of a traffic light, lane closure status, etc.).

Moreover, a coordination component of the feature database update system may perform coordination and/or distribution of information related to active features. For example, when a new observation of a feature is received by the feature database update system, the feature component may update the active status of the associated feature database entry in the feature database. The coordination component may determine the active status for the feature database entry associated with the feature has changed (e.g., an indication of whether a traffic light is green or red, how long it has been in that state, how stale the active status information is, etc.). In some examples, the coordination component may then distribute the current active status of active features to vehicles that request the information. Additionally or alternatively, the coordination component may distribute the updated active status of an active feature to vehicles in a region around the active feature and/or distribute a current status of the active feature to vehicles that enter the region.

As previously mentioned, examples according to this disclosure may utilize the features in feature-based route planning (e.g., use information from feature database entries in the feature database for route planning).

In some examples, a planning component may initialize a trip from a current location of an autonomous vehicle to a destination. The planning component may determine multiple routes to the destination, which may include routes with different drop off points. The planning component may then subdivide the routes into segments (e.g., divided at each route decision point where routes diverge and/or converge along different paths). The planning component may then query the feature database to determine features along each segment.

The costs of the features may be determined. In some examples, the costs of the features may be determined based on associated feature database entries in the feature database and other factors as applicable such as traffic levels, time of day, group effects, current statuses of active features and/or other information that may be provided by the coordination component.

The planning component may determine a cost for a segment based at least in part on the costs of the features along the segment. Using the determined segment costs, costs for the routes may be determined. Then, a lowest cost route may be determined and selected for use by the autonomous vehicle.

The feature capture and feature-based route planning techniques described herein can improve a functioning of a computing device, such as an autonomous vehicle system, by providing updated feature data that reflects features in the environment for performing subsequent operations to control an autonomous vehicle with improved accuracy. For example, the feature data can allow subsequent processes such as route planning, trajectory generation, and the like to be performed more accurately while requiring less manual intervention and/or disruption. For example, in some instances, features may be used in route planning to determine the cost of travel along routes with greater understanding of likely slowdowns or other issues that may affect travel. In a particular example, unlike prior systems which utilized historical travel times along a path without a detailed understanding of the features that contributed to those travel times, feature-based route planning may properly account for costs caused by individual features. These and other improvements to the functioning of the computer are discussed herein.

Example Architecture

FIG. 1 illustrates an example autonomous vehicle system 100 that may detect features in an environment, update a feature database using information about the detected features and perform feature-based route planning based at least in part on the feature database, in accordance with examples of the disclosure. In some instances, an autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. Moreover, in some instances, the feature capture and feature-based route planning techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

According to the techniques discussed herein, the autonomous vehicle 102 may receive sensor data from sensor(s) 104 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, etc. For example, the autonomous vehicle 102 may receive image(s) 106(1) to 106(M) (collectively "images 106"), where M is any integer greater than 1, from the sensor(s) 104. The discussion herein primarily discusses images for ease of understanding and to avoid unnecessary complexity in illustration, but it is contemplated that the techniques may be applied to any sensor data that has the capability to represent an object or feature (e.g., a point cloud including points that represent an object).

In some examples, the autonomous vehicle may include computing device(s) 108 that may include a localization component 110, a perception component 112, a planning component 114, a map component 116, a feature component 118, and/or a system interface 120.

In at least one example, the localization component 110 can include functionality to receive data from the sensor system(s) 104 to determine a position of the vehicle 102 (also referred to herein as localization data). For example, the localization component 110 can include and/or request/receive a map of an environment (e.g., from a map component 116) and can continuously determine a location of the autonomous vehicle within the map (e.g., localize a position of the autonomous vehicle 102 on a global map and/or a local map). In some instances, the localization component 110 can utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 110 can provide the localization data to various components of the vehicle 102 to determine an initial position of an autonomous vehicle for generating a candidate trajectory, as discussed herein.

The perception component 112 may include one or more ML models and/or other computer-executable instructions for detecting, identifying, segmenting, classifying, and/or tracking objects from sensor data collected from the environment of the autonomous vehicle 102. In some instances, the perception component 112 may receive sensor data from sensor(s) 104 of the autonomous vehicle 102 and localization data from the localization component, determine perception data from the sensor data, and transmit the perception data to a planning component 114 for use by the planning component 114 to determine one or more trajectories, and/or control motion of the autonomous vehicle 102 to traverse a path or route, though any such operation may be performed in various other components. In some instances, the perception data may comprise a region of interest (an "ROI") and/or a track associated with an object detected in sensor data. The planning component 114 may determine instructions for controlling operations of the autonomous vehicle 102 based at least in part on the ROI and/or the track.

Further, the perception component 112 or feature component 118 may detect features based on the received sensor data. For example, the perception component may detect features based on the sensor data in a similar manner to that discussed above for object detection or the feature component may utilize the perception data of detected objects and determine features from among the detected objects. As mentioned above, example features may include traffic lights, road signs, crosswalks, speed bumps, hills, road damage (e.g. pot holes, washboards, etc.), lane merges, unprotected left turns, school zones, rail crossings, lane restrictions (e.g., HOV, express, or time of day restricted lanes), traffic inlets/outlets (e.g., parking lot or parking garage exits), highway on-ramps, off-ramps, passing restrictions (e.g., either in same direction traffic or passing using opposite direction of travel lanes), presence or absence of center of road turn lane, presence or absence of civic buildings, industrial or technology campuses, shopping centers or the like, and any other feature that may impact travel or route desirability.

For example, the perception component 112 or feature component 118 may detect a feature in the environment and classify the feature (e.g., "traffic signal," "cross walk," "forced lane merge," "lane restriction," "pot hole," "alleyway"). In the illustrated example, autonomous vehicle 102 may receive image(s) 106 comprising image 106(1), which includes a representation of a two traffic signals. Of course, images are merely used herein as an example and other types of sensor data may be used. The perception component 112 or feature component 118 may determine features 126(1), 126(2), 126(3), and 126(4) represented in image 106(1) are features (e.g. corresponding to a traffic light, a traffic light, a crosswalk and a forced lane merge, respectively). In the illustrated example, the features 126 are represented as bounding boxes, although other techniques for identifying the features are contemplated.

As will be discussed in more detail below, the feature component 118 may operate to analyze detected features and provide information related to at least some detected features to a feature database update system 134.

In some examples, the perception component 112 may also track an object, such as the objects corresponding to or associated with features 126. In some examples, a track may comprise an association between objects detected in two different sets of sensor data. The track may thereby be an indication that the perception component 112 is identifying two object detections as corresponding to a same object. In some examples, the track may additionally or alternatively comprise a current, predicted, and/or historical position, heading, velocity, acceleration, distance, ROI(s), and/or center of the object. In some examples, any of these characteristics may be real world values (e.g., a velocity of the object in the real world in meters per second, kilometers per hour, a heading relative to the sensor that captured them image) and/or image-relative characteristics (e.g., a velocity associated with movement of a representation of the object across images in pixels per second, a heading that identifies an angle of movement of the representation of the object in the image). Of course, the track information for an object may comprise any data structure and/or format.

In some instances, the localization component 110 may determine a position of the autonomous vehicle 102 (e.g., using any sensor data to localize the autonomous vehicle 102). The perception component 112 may determine data related to objects in the vicinity of the autonomous vehicle 102, route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception component 112 may be collectively referred to as "perception data." In some instances, the map data may be retrieved and provided by the map component 116. More particularly, based on a position of the autonomous vehicle 102, the map component 116 may load or otherwise retrieve from a memory or network local map data and global map data for use by the perception component 112 in detecting and classifying objects from the sensor data. Once the perception component 112 has identified and/or segmented objects from the sensor data and/or determined other perception data, the perception component may provide the perception data, including the object detections and/or instance segmentations, to a planning component 114.

In some instances, the planning component 114 may use perception data, including the ROIs, tracks, and/or segmentations (discussed further below) to generate instructions for controlling operation of the autonomous vehicle 102. For example, the planning component 114 may determine one or more routes for the autonomous vehicle 102 from a first location to a second location. The planning component 114 may then evaluate the routes based at least in part on features along each route.

For example, the planning component 114 may initialize a trip from a current location of the autonomous vehicle 102 to a destination. The planning component 114 may determine multiple routes to the destination, which may include routes with different drop off points. The planning component 114 may then subdivide the routes into segments (e.g., divided at each route decision point where routes diverge along different paths). The planning component 114 may then query the feature component 118 to determine features along each segment. The feature component 118 may access the feature database 122 to retrieve feature database entries for features along the segments.

The feature component 118 may determine the costs of the features. In some examples, the feature component 118 may determine the costs of a feature based on an associated feature database entry in the feature database 122 and other factors as applicable such as traffic levels, time of day, group effects, current statuses of active features and/or other information that may be provided by the coordination component 142 of the system.

The planning component 114 may determine a cost for each segment based at least in part on the costs of the features along the segment (e.g. as a summation of the individual feature costs for features along the segment). Using the determined segment costs, a cost for each of the route may be determined (e.g. as a summation of individual segment costs associated with each route). Then, a lowest cost route may be determined and selected for use by the autonomous vehicle 102.

Once a route is selected, the planning component 114 may generate, substantially simultaneously, a plurality of potential trajectories for controlling motion of the autonomous vehicle 102 in accordance with a receding horizon technique (e.g., 1 micro-second, half a second, two seconds, eight seconds, etc.) and based at least in part on an ROI, track, and/or segmentation, to control the vehicle to traverse the route; and select one of the potential trajectories as a trajectory of the autonomous vehicle 102 that may be used to generate a drive control signal that may be transmitted to drive components of the autonomous vehicle 102.

In addition, the feature component 118 may determine if a detected feature (1) does not correspond to a feature in the feature database 122 or (2) appears to correspond to a feature in the feature database but is designated as unresolved or as an active feature. If so, the feature component 118 may flag the detected features in a plurality of frames and cause the system interface 120 to send the sensor data of the flagged features to the feature database update system 134 over one or more network(s) 124.

As described above and as discussed throughout this disclosure, the vehicle 102 can send sensor data to one or more computing device(s) 128, via one or more network(s) 124. In some examples, the vehicle 102 can send raw sensor data (e.g., images or other raw sensor data without metadata or identification of detected features) to the computing device(s) 128. In other examples, the computing device(s) 128 can send processed sensor data and/or representations of sensor data (e.g., processed images or other processed sensor data, for example, with metadata or other additional data identifying of detected feature(s) whose presence caused the images to be flagged) to the computing device(s) 128. In some cases, the vehicle 102 can send sensor data (raw or processed) to the computing device(s) 128 as one or more log files. For ease of understanding, the following discussion may refer to sensor data as image data. However, implementations are not so limited and other sensor data such as those described above may be utilized in addition or alternatively to image data.

The computing device(s) 128 may receive the sensor data and may generate and/or update feature data of the feature database 122 based on the sensor data. In at least one example, the computing device(s) 128 can include one or more processors 130 and memory 132 communicatively coupled with the one or more processors 130. In the illustrated example, the memory 132 of the computing device(s)

128 stores a feature database update system 134 that may include or utilize the functionality of a perception and localization component 136 (hereinafter perception component 136), a feature component 138, a cost component 140 and a coordination component 142. In at least one example, the computing device(s) 128 may be or be a portion of an autonomous vehicle control system managing operations of a plurality of autonomous vehicles 102.

As discussed above, the feature database update system 134 may receive sensor data via the network(s) 124. The feature database update system 134 may be configured to update a feature database 122 based on the received sensor data.

In some examples, the perception component 136 of the feature database update system 134 may perform perception processing on the sensor data to detect an object in the sensor data. The detected object may be determined to be a feature or associated with a feature and/or tracked over multiple frames (e.g., multiple frames of video or multiple still image frames). The information received over the network(s) 124 may further include or the feature database update system 134 may otherwise determine localization information (e.g., the location of the image capture sensor) in a coordinate system used by the autonomous vehicle system. More particularly, the localization information may localize the vehicle (or image capture sensor) in the environment and may be generated using a variety of techniques (e.g., SLAM) and using potentially many types of sensor data (lidar, gps, image, IMU). The localization information may also include the pose (position, orientation, etc.) of the camera.

Based on the tracking and the localization information, a feature location for the features in the coordinate system of the autonomous vehicle system may be generated. For example, based on the vehicle position and the camera pose, a UTM (universal transverse Mercator) location (or other location such as latitude and longitude) and a height associated with each pixel in sensor data may be determined. Over a series of frames, the perception component 136 may triangulate a position of the tracked feature in the environment and determine the UTM and/or height information for each frame with adequate certainty. In other words, in some examples, the perception component 136 may project a ray from the camera origin to each pixel in the image and triangulate the position over time. In some examples, this process may be performed without depth data. The UTM and/or height information associated with the center of the tracked feature determined over the series of frames may be utilized as the feature location.

The perception component 136 may also classify the detected feature (e.g., as a road sign, a traffic light, and so on as discussed above). In some examples, the perception component 136 may perform functions similar and/or in a similar manner to that discussed above with regard to the perception component 112.

The feature component 138 of the feature database update system 134 may retrieve feature data provided for the environment, area or geographic location at which the sensor data was captured. In an example, the environment, area or geographic location at which the sensor data was captured may be provided as metadata to the received sensor data or otherwise provided by the system capturing the sensor data.

Based on the position and/or classification of the feature detected by the perception component 136 and the feature data provided for the environment, area or geographic location at which the sensor data was captured, the feature component 138 of the feature database update system 134 may determine whether or not the feature database 122 includes a feature of the determined classification at the feature location.

In the case that the detected feature does not appear in the feature database 122, the feature component 138 may generate a new feature database entry for the detected feature and add the new feature database entry to the feature database 122. The feature component 138 may determine the parameters for the new feature database entry based on one or more of (1) default values for the feature classification and (2) the received sensor data.

In the case that the detected feature appears to correspond to a feature database entry in the feature database 122, the feature component 138 may determine whether the corresponding feature database entry is designated as unresolved or as an active feature. If corresponding feature database entry is designated as unresolved or as an active feature, the feature database update system 134 may update the parameters of the corresponding feature database entry based on the received sensor data.

The feature component 138 may determine or update the parameters of a feature database entry using the received sensor data. In such a case, the detected feature may be analyzed over multiple frames (e.g., multiple frames of video or multiple still image frames) of the received sensor data.

In some examples, the feature component 138 may classify the detected feature and determine pertinent information for the detected feature. For example, the feature component 138 may determine a class of the feature. As mentioned above, some example features and/or feature classes may include traffic lights, road signs, crosswalks, speed bumps, hills, road damage (e.g. pot holes, washboards, etc.), lane merges, unprotected left turns, school zones, rail crossings, lane restrictions (e.g., HOV, express, or time of day restricted lanes), traffic inlets/outlets (e.g., parking lot or parking garage exits), highway on-ramps, off-ramps, passing restrictions (e.g., either in same direction traffic or passing using opposite direction of travel lanes), presence or absence of center of road turn lane, presence or absence of civic buildings, industrial or technology campuses, shopping centers or the like, and any other feature that may impact travel or route desirability.

The feature component 138 may further designate features as active or static features. As mentioned above, an active feature may be a feature that changes state over time. For example, active features may include traffic lights, rail crossings, lane restrictions or closures from traffic accidents or traffic congestion or so on. Static features may be features that may not change state over time. For example, static features may include road signs, crosswalks, speed bumps, hills, lane merges, unprotected left turns and so on. The designation of whether some classes of features are active or passive may vary from example to example. For example, features that change state based on time of day, such as school zones, may be treated as static features with different effects depending on time of day or as active features. Similarly, a rail road crossing may be treated as a static feature or an active feature. Active features may be tracked or monitored by the feature database update system 134 and updated to autonomous vehicles over time. For example, the timing of a traffic light feature may be determined over time and the current state of the traffic light may be updated and maintained as autonomous vehicles provide observations. Static features may not be monitored or updated regularly once resolved in the feature database 122.

The feature component 138 may further designate features as resolved or unresolved. As used herein, an unresolved feature may be a feature whose feature database entry is being refined by the feature database update system 134 (e.g., other than monitoring active features for active feature changes). For example, after a first detection of a speed bump in a first set of sensor data, the feature component 138 may generate a feature database entry including parameters of the speed bump that may be approximated based on the sample set provided (e.g., the approximate height, width and position of the speed bump may have errors due to the limited sample set). The feature component 138 may designate the feature database entry for the speed bump as unresolved such that the parameters are refined based on future observations by autonomous vehicles. In another example, a traffic light may be observed over time to refine a timing pattern of the traffic light (e.g., green for 30 seconds then red for 90 seconds or green until a vehicle approaches on the crossing road, 20 seconds before changing to red, then 60 seconds before going green again). In some examples, the feature component 138 may also resolve changes in patterns over time (e.g., time of day, day of week, etc.). Once the feature parameters have been refined, for example, to within an acceptable margin of error, the feature may be designated as resolved and the feature component 138 and feature database update system 134 may not perform further analysis for resolved static features or for resolved active features other than the monitoring of active changes.

The feature component 138 may also designate links or groupings among features. Linked features or grouped features may have group effects assigned thereto which may affect the cost of the grouped features in some scenarios. For example, a set of traffic lights may be observed to have a linked timing such that vehicles leaving a green light at a first traffic light in the set will, under some determine set of traffic conditions, arrive at the subsequent lights in the set while the subsequent lights are green. In such a case, the cost of the traffic lights after the first may be reduced due to the high likelihood the subsequent lights will not have an impact on the travel time of the autonomous vehicle (e.g., because the lights will already be green as the autonomous vehicle reaches and passes the lights). In some examples, features may be part of any number of groups or links or not part of any group or link.

The feature component 138 may also analyze and designate heavy traffic effects on the features. For example, the effect of a forced lane merge on travel times through a section of road may be minimal during light traffic but result in severe slowdowns and congestion when traffic is heavy. Traffic may vary without regard to time of day. As such, some example systems may implement or determine heavy traffic effects because time of day based differentiation may not capture or address such heavy traffic effects. In some examples, the heavy traffic effects may impact other parameters of the feature. For example, the group effects assigned to a group of features may be modified by heavy traffic effects. In some examples, heavy traffic may disrupt the synchronization of a group of traffic lights whose timing is synchronized to allow an autonomous vehicle starting from a first light as it turns green to arrive at subsequent lights while they are already green under normal traffic conditions. Under such heavy traffic conditions, the group effect of reducing the cost of the subsequent lights may be disabled or ignored such that each light is given its full cost. In other words, because the synchronization is disrupted, the vehicle may not reach subsequent lights while those lights are green. As such, no cost reduction may be applied.

A cost component 140 of the feature database update system 134 may determine a cost for the detected feature (e.g., based on parameters of the feature). Depending on the implementation, the cost for features may take various forms and be determined differently. In some examples, the cost may be a time or a value indicating a relative amount of time the feature may add to a route's travel time (e.g., indicative of an amount of time to traverse a region of the environment associated with the feature or the amount of time contributed by the feature to the amount of time to traverse the region associated with the feature) but not directly correspond to any measurement of time. Other considerations may be factored into the cost. For example, the cost may factor in comfort such as by increasing the cost for features that may jostle passengers (e.g., speed bumps, pot holes, low water crossings, rail crossings, etc.) or subject the passengers to larger lateral accelerations (e.g., sharp corners, turns, etc.). Many other factors may be considered.

In some examples, the cost component 140 may determine and/or refine the cost of features over multiple observations by autonomous vehicles. A default cost for the feature may be determined based on the feature class. The default cost may be adapted based on the parameters of the feature. The cost may be further adapted based on the current received sensor data and future observations of the feature by autonomous vehicles and the observed effect of the feature on travel during those observations.

In some examples, the cost component 140 of the feature database update system 134 may provide the cost of a feature as a range of values. For example, a cost of a feature may specify a minimum cost and a maximum cost for the feature. In an example, a forced lane merge may have a range of costs during normal traffic from a minimum cost of no impact on travel time to a maximum cost of a moderate increase in travel time. More particularly, such a range of costs may indicate that the forced lane merge may have no impact or cause a moderate increase in travel time under normal travel conditions.

In some examples, the cost component 140 may designate different costs for a feature during different periods of the day. For example, the cost for a school zone may be represented as two ranges, one during school zone hours and one outside of the school zone hours, and the cost component 140 may analyze and designate costs for the school zone feature based on observations from the associated periods of time.

Further, the cost component 140 of the feature database update system may designate heavy traffic costs for features. In addition to changing how features may impact travel along routes, heavy traffic may affect the simple magnitude of any slowdowns or increased travel time. For example, while under normal traffic conditions, a forced lane merge feature may have a range of costs from none to moderate, under heavy traffic conditions, the forced lane merge feature may impose a heavy cost or slowdown far in excess of its normal range of costs (e.g., by creating congestion). Accordingly, the cost component 140 may designate a separate heavy traffic cost to reflect the cost of the feature under heavy traffic conditions.

Some examples may include features and feature costs reflective of concerns other than or in addition to travel concerns along potential routes. For example, some features may raise or lower the desirability of a route based on drop off points at a destination. In an example, some features (e.g., alleyways, low water crossings, drainage areas, and access locked areas) are not desirable drop off points and reduce the desirability of being dropped off in close proximity to those features. Such features and feature costs may be taken into consideration when planning routes. As such, a route with a low feature cost along the travel path but which includes a drop off point at the destination in a back alley drainage area with no public access to the building at the destination address may be discarded in favor of a route with a higher cost along the travel path but with a drop off point at a front entrance of the building at the destination address.

In some examples, different costs or parameters may be assigned to one or more features based on various situations, configurations, or preferences. For example, the cost component 140 may assign different sets of parameters for different risk acceptance preferences of a passenger, cost avoidance policies of an operator, or based on various other considerations. For example, the cost component 140 may determine that a particular feature is unlikely to cause delays but, when it causes a delay, the delay is significant and that the delays are not time of day or heavy traffic correlated. In such an example system, the preferences of the passenger or operator may be considered to select the appropriate costs or parameters. Such a system may allow a passenger to risk delay when the most likely outcome is a large time saving even though the less likely outcome is a large delay. For example, a route with a drawbridge may be a fast route in general but, in the cases in which the drawbridge is raised, the delay may be substantial (e.g., 20 minutes). Some passengers may accept the risk of using the generally faster route even though the drawbridge may cause a large delay. On the other hand, another passenger may select preferences that may generally be slower but have a lower risk of large delays.

Further, in some examples, the system may have risk-cost preferences set by the operator. In some such examples, the operator may allow the passengers to vary from the operator's default preferences (e.g., when the passenger has agreed to the possible delays resulting from the passenger's choices and agreed to cover any additional costs).

The feature component 138 may use the costs determined by the cost component 140 to update feature database entries in the feature database.

In addition to the above operations, the feature component 138 may determine whether parameters of a feature have been resolved. As noted above, the parameters of a speed bump feature may not be fully resolved after a first observation by an autonomous vehicle (e.g., the height, width, depth or other parameter of the speed bump may have an unacceptably high margin of error). Designating the feature as unresolved may result in subsequent updates based on future observations. The feature component 138 may determine that the parameters of the feature are within an acceptable margin of error and, based on such a determination, designate the feature as resolved. In an example, a one (1) millimeter (mm) of uncertainty for the position, height, width, depth, and other parameters of a speed bump feature may be the threshold for an acceptable margin of error for measurements. In such an example, refinement may continue based on additional observations until the system has ascertained the values of the parameters of the feature to a level of uncertainty that is less than the threshold. Some systems may also have a minimum number of observations needed before marking a feature as resolved. Thereafter, in some implementations, the feature component 138 and the feature database update system 134 as a whole may not perform updates for the resolved feature other than to monitor active feature changes (e.g., the current state of a traffic light, lane closure status, etc.).

Moreover, a coordination component 142 of the feature database update system 134 may perform coordination and/or distribution of information related to active features. For example, when a new observation of a feature is received by the feature database update system 134, the feature component 138 may update the active status of the associated feature database entry in the feature database 122. The coordination component 142 may determine the active status for the feature database entry associated with the feature has changed (e.g., an indication of whether a traffic light is green or red, how long it has been in that state, how stale the active status information is, a confidence level in the active status, etc.). In some examples, the coordination component 142 may then distribute the current active status of active features to vehicles that request the information. Additionally or alternatively, the coordination component 142 may distribute the updated active status of an active feature to vehicles in a region around the active feature and/or distribute a current status of the active feature to vehicles that enter the region.

Any of the items determined above by the feature component/cost component may be determined procedurally, using machine learned and/or by other techniques for analyzing and producing values from multiple observations.

Other statistical values or cost metrics may be used for determining or representing cost. For example, some systems may determine and use a standard deviation, skew, mean, median or so on in the above operations.

Moreover, other distributions of functionality between autonomous vehicles and other computing devices are within the scope of this disclosure. Some examples may include peer to peer sharing of feature data between autonomous vehicles with or without the presence of the computing device 128. In some examples, including or not including the peer-to-peer sharing of information between autonomous vehicles 102, one or more functions of the autonomous vehicle 102 may be performed by the computing devices 128 or one or more functions of the computing devices 128 may be performed by the autonomous vehicle 102. For example, the route planning or a portion thereof based on the features may be performed by the computing devices 128. In some examples, the computing devices 128 may at least partially determine routes for popular routes or segments and provide the feature based precomputed routes or route costs to the autonomous vehicles 102. Any other arrangement of functionality between the computing devices 128 and autonomous vehicle to performed the processes disclosed herein is also within the scope of this disclosure.

While the example system to FIG. 1 operates based on sensor data captured by autonomous vehicles, implementations are not so limited and the source of the sensor data may vary. Other variations or features may be incorporated into some examples. For example, some implementations may incorporate a filtering functionality configured to determine a difference between the captured data regarding the new, missing or changed feature(s) and the existing feature database. The filtering functionality may determine whether the difference is above a threshold and discard or otherwise not perform the feature database update process when the difference is below the threshold. This may reduce the number of false positives caused by issues such as miscalibrated sensors or similar factors.

Figure 2A:
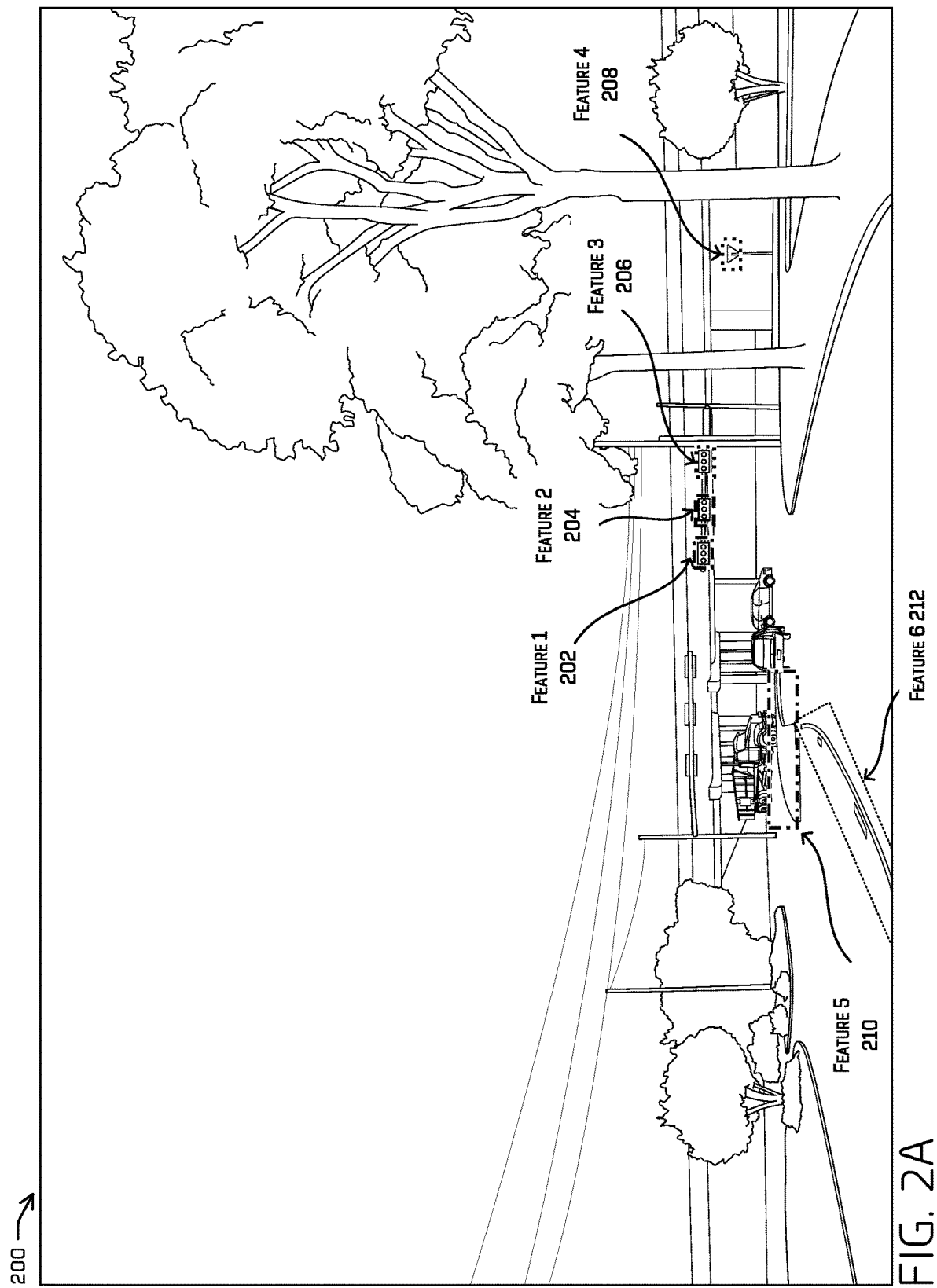
Figure 2C:
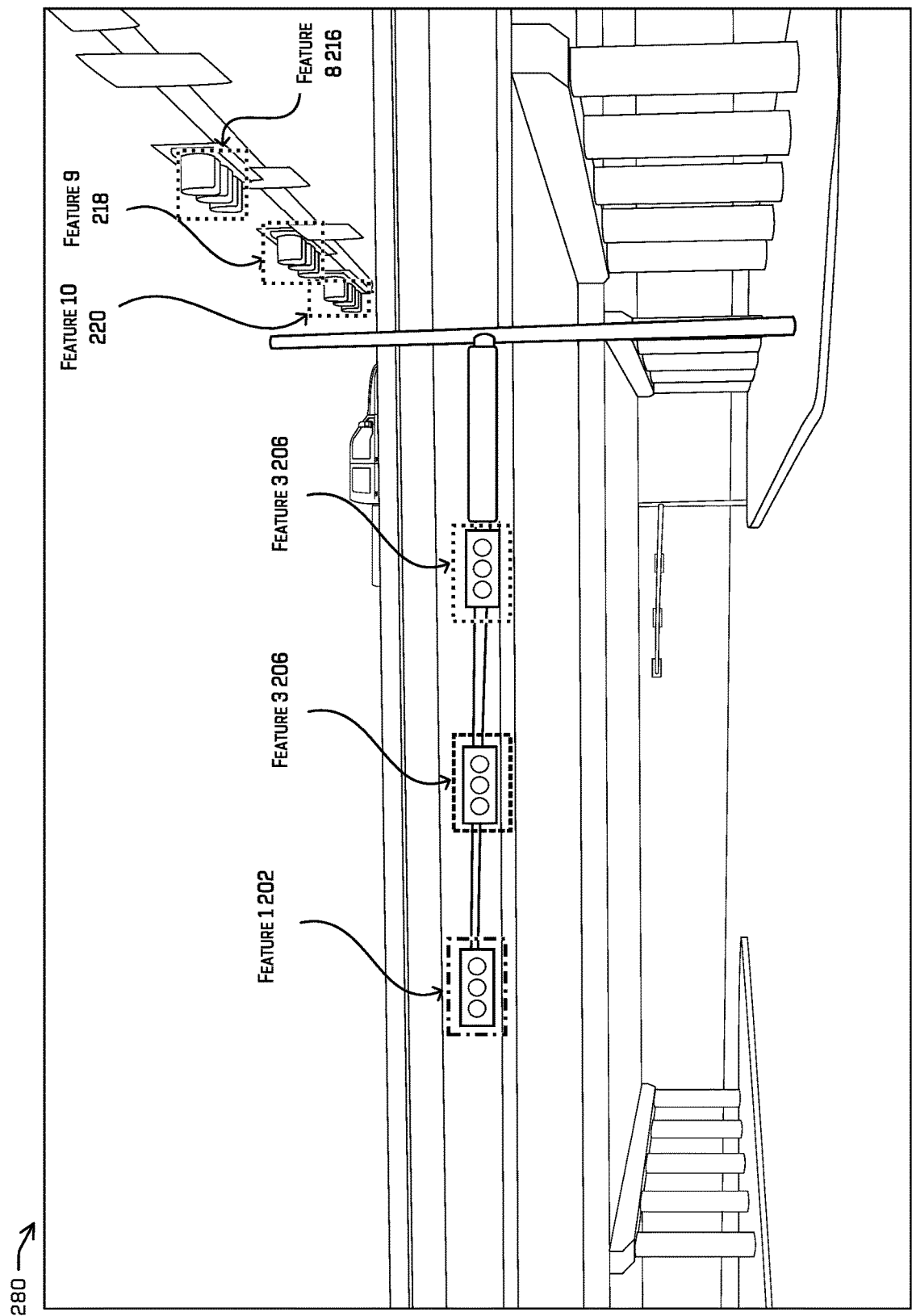

FIGS. 2A-2C illustrate a series of images 200, 240 and 280 of an intersection captured at different times and an example detection and tracking of features in the series of images by the perception component 136. More particularly, FIG. 2A illustrates an image 200 (also referred to as an image frame or frame) of the intersection captured at a first time, FIG. 2B illustrates an image 240 of the intersection captured at a second time, and FIG. 2C illustrates an image 280 of the intersection captured at a third time.

For ease of illustration and explanation, the detection and tracking of features in the figures is limited to ten features. Embodiments are not limited and any other feature included in the feature database may detected and tracked in a similar process. For example, other objects that may be included as features may include other signage and road features. More particularly, such objects may include signage and signals such as crosswalk signals (walking and/or hand indicators), speed limits signage, stop signs, yield signs, street name signage, one-way street signs, turn policy signs (e.g., no right on red, no U-turn, do not enter and wrong way, no left turn, etc.), and so on. Road features which may be included in the feature database may include painted markings such as crosswalks, stop lines, lane markings, and so on.

Further, though three image frames are shown in the examples illustrated in FIGS. 2A-2C, more or fewer image frames may be utilized and the discussion below presumes additional frames are processed between frames 200 and 240 and 240 and 280 which are not illustrated to avoid excess prolix. However, implementations may utilize any number of frames.

In FIG. 2A, the perception component 136 may perform detection and tracking processing on the image 200. The feature component 138 may detect six features, feature 1 202, feature 2 204, feature 3 206, feature 4 208, feature 5 210, and feature 6 212. Feature 1 202, feature 2 204, feature 3 206 may correspond to the traffic signals within corresponding regions of interest (ROIs). Feature 4 208 may correspond to a yield road sign that is directed to cross traffic. Feature 5 210 may correspond to a median that ends a turn lane. Feature 6 212 may correspond to lane markings indicating the center lane may not be used for passing. Each detected feature may be associated with a classification, as discussed herein.

In FIG. 2B, the perception component 136 may perform detection and tracking processing on the image 240. Similar to FIG. 2A, the feature component 138 may detect feature 1 202, feature 2 204, feature 3 206 and feature 4 208. Because of the perspective change between images 200 and 240, feature 5 210 and feature 6 212 may no longer be detected. Moreover, feature 7 214 and feature 8 216 may be detected. Feature 7 214 may correspond to a stop line for the intersection that doubles as a cross walk. Feature 8 216 may correspond to a traffic signal for the cross traffic.

In FIG. 2C, the perception component 136 may perform detection and tracking processing on the image 280. From the perspective of image 280, the feature component 138 may detect feature 1 202, feature 2 204, feature 3 206 and feature 8 216. Because of the perspective change between images 240 and 280, feature 4 208 and feature 7 214 may no longer be detected. Moreover, feature 9 218 and feature 10 220 may be detected. Feature 9 218 and feature 10 220 may correspond to additional traffic signals for cross traffic.

Based on the detection and tracking and the location of the camera at the time each of images 200, 240 and 280 were captured, the perception component may estimate positions for each feature 202-220 (e.g., based on the location of the camera when it captured each of images 200, 240 and 280 and the relative position of the feature 202-220 to the camera). The feature component 138 may also classify the detected feature (e.g., as a road sign, a traffic light, etc.). Additional discussion of techniques and systems for determining object positions and classifications is provided in U.S. patent application Ser. No. 15/814,870, entitled "Pose Determination From Contact Points," the entirety of which is herein incorporated by reference.

The feature component 138 of the feature database update system 134 may retrieve feature data provided for the environment, area or geographic location at which the sensor data was captured. In an example, the environment, area or geographic location at which the sensor data was captured may be provided as metadata to the received sensor data or otherwise provided by the system capturing the sensor data.

Based on the position and/or classification of the features 202-220 detected by the feature component 138 and the feature data provided by the feature database 122, the feature component 138 may determine whether or not the feature database includes corresponding features of the determined classification at the feature locations.

In the case that the detected feature does not appear in the feature database 122, the feature component 138 may generate a new feature database entry for the detected feature and add the new feature database entry to the feature database 122. The feature component 138 may determine the parameters for the new feature database entry based on one or more of (1) default values for the feature classification and (2) the received sensor data.

In the case that the detected feature appears to correspond to a feature database entry in the feature database 122, the feature component 138 may determine whether the corresponding feature database entry is designated as unresolved or as an active feature. If corresponding feature database entry is designated as unresolved or as an active feature, the feature database update system 134 may update the parameters of the corresponding feature database entry based on the received sensor data.

Example Process

Figure 3:
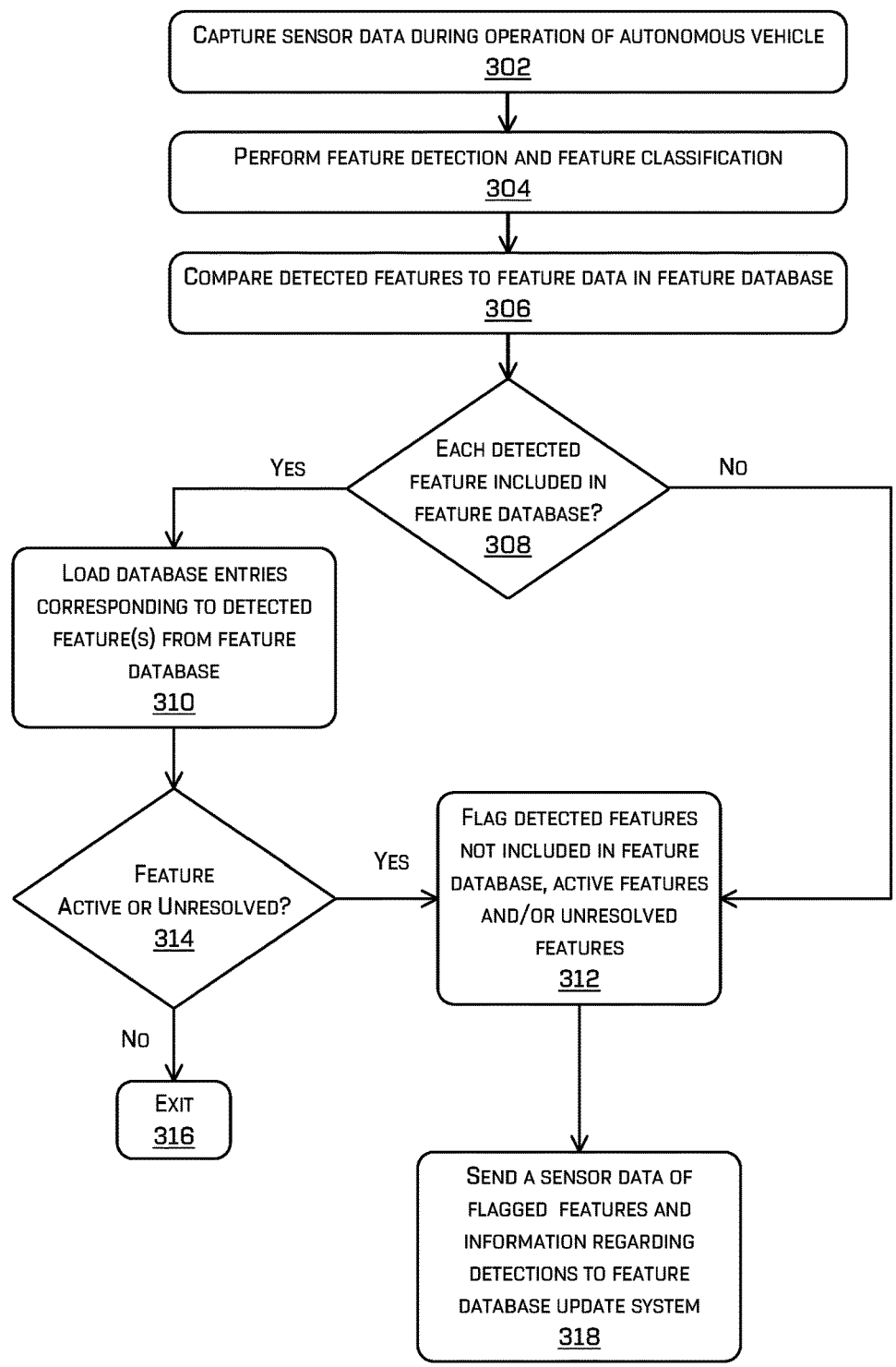
FIG. 3 illustrates a flow diagram of an example process for detecting features in an environment and providing data regarding the detected features for processing by a feature database update system, in accordance with examples of the disclosure.

FIG. 3 illustrates an example process 300 for detecting features in an environment for processing by a feature database update system. In some examples, process 300 may be accomplished by component(s) of system 100. In some examples, the example process 300 may be performed by an onboard computer system of an autonomous vehicle 102 or may be performed in whole or in part by aspects of the computing device(s) 128.

At operation 302, the sensor(s) of the autonomous vehicle (or any vehicle or system capturing sensor data) may capture sensor data during operation of the autonomous vehicle. At operation 304, the computing devices onboard the autonomous vehicle may perform feature detection and classification on the captured sensor data. The detected and classified features in the sensor data may then be compared to features in the feature database at 306. For example, the detected features may be compared with features included in the feature database based on location, type, and/or other parameters.

At operation 308, the onboard computing devices may determine whether each detected features is included in the feature database. If not, the process may continue to 310. Otherwise, the process may continue to operation 312.

At 310, the onboard computing devices may load database entries corresponding to the detected feature(s) from the feature database. At 314, the onboard computing devices may determine whether any detected features are active or designated as unresolved. If so, the process may continue to 312. Otherwise, the process may continue to operation 316 and exit.

At operation 316, the onboard computing devices may flag detected features that are not included in the feature database, detected active features and/or detected unresolved features in metadata or other data. The onboard computing devices may then send sensor data of the flagged features and the metadata or other data regarding the detected and flagged features to the feature database update system at 318.

Note that, although the example process 300 is depicted as sequential operations, it is understood that the operations discussed herein may be performed in a different order, simultaneously, and/or by one or more devices. Further, though process 300 is described as occurring on an autonomous vehicle, implementations are not so limited. For example, in some implementations, the detection and flagging of features for feature database update may be performed by a manually driven vehicle with an onboard sensor and computing device system that performs the operations discussed above. Moreover, in some examples, the sensors and computing devices performing the operations discussed above may not be aboard or in any way associated with a vehicle. Further, in other examples, all of the sensor data may be uploaded to the feature database update system without processing and flagging.

Figure 4:
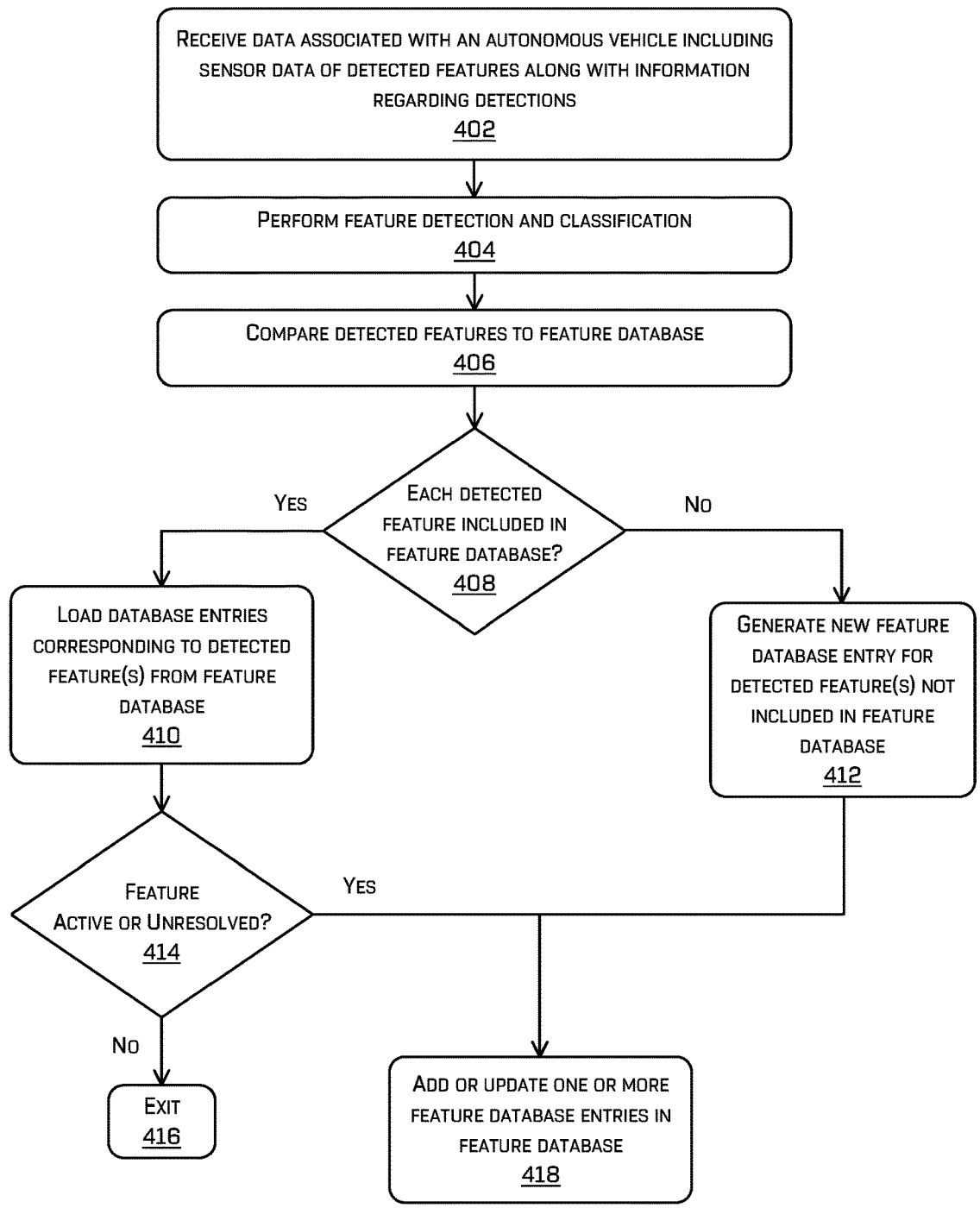
FIG. 4 illustrates a flow diagram of an example process for updating a feature database based on detecting, classifying, and monitoring features in an environment, in accordance with examples of the disclosure.

FIG. 4 illustrates an example process 400 for updating a feature database based on detecting features in an environment. In some examples, example process 400 may be accomplished by component(s) of system 100. In some examples, the process 400 may be performed by a feature database update system 134 of an autonomous vehicle control system.

At operation 402, the feature database update system may receive data associated with an autonomous vehicle including sensor data of detected features not included in the feature database, detected active features and/or detected unresolved features along with information regarding detections. However, as mentioned above, implementations are not limited to inputs received from an autonomous vehicle. In other examples, the input may be raw sensor data or another source of flagged or processed sensor data.

At 404, the feature database update system may perform feature detection and classification. The feature detection and classification may utilize metadata included with the received data, if any. The detected features in the sensor data may then be compared to features in the feature database at 406.

At operation 408, the onboard computing devices may determine whether any detected features are not included in the feature database. If not, the process may continue to 410. Otherwise, the process may continue to operation 412.

At 410, the onboard computing devices may load database entries corresponding to the detected feature(s) from the feature database. At 414, the onboard computing devices may determine whether any detected features are active or designated as unresolved. If so, the process may continue to 418. Otherwise, the process may continue to operation 416 and exit.

At 412, the feature component may generate new feature database entr(ies) for the detected feature(s) not included in feature database.

At 414, the feature component may add or update one or more feature database entries in feature database based on an analysis of the sensor data. The determination of parameters for feature database entries is discussed in detail above with respect to FIG. 1.

Note that, although the example process 400 is depicted as sequential operations, it is understood that the operations discussed herein may be performed in a different order, simultaneously, and/or by one or more devices. Further, though process 400 is described as receiving sensor data from an autonomous vehicle or as being part of an autonomous vehicle control system or as updating a feature database used by autonomous vehicles, implementations are not so limited. For example, in some implementations, the detection of features and updating of feature database based thereon may utilize sensor data captured using a manually driven vehicle with an onboard sensor and computing device system that performs the operations discussed above. Moreover, in some examples, the sensors and computing devices used to capture the sensor data may not be aboard or in any way associated with a vehicle.

FIGS. 5A and 5B illustrate example feature database entries 500 and 502. More particularly, the example feature database entries illustrated provide a feature ID field, a feature class field, a resolved flag field, an active/static type flag field, a timing field, a minimum cost field, a maximum cost field, a group ID field, a group effect field, a heavy traffic cost field, a heavy traffic effect field, an active tracking status field, and a current status of active tracking field. It should be noted that the illustrated fields are examples for purpose of illustration and more or fewer fields and/or different fields may be provided in some examples. For example, the feature entries may include a location field (not shown) that may identify the location of the feature relative to the world (e.g., based on a coordinate system, relative to other landmarks, etc.) As an example, database entries may be retrievable based on the location field (e.g., as part of determining route or segment costs).

As shown, feature database entry 500 indicates the feature identifier of 123 is assigned to a feature with a traffic light class. The database entry 500 is resolved. Because the feature is a traffic light, the active/static type flag field indicates the feature is an active feature and the timing field indicates the feature operates on a cycle of being green for 30 seconds, red for 90 seconds, then repeating. The range of costs for the traffic light are a 25 minimum cost and a 60 maximum cost. In the illustrated examples and as discussed above, costs may not be defined in real world units and may instead be indicative of a relative travel time impact or relative desirability or undesirability of the feature occurring in a route.

Feature 123 of feature database entry 500 is indicated as a member of group 2333 which has a group effect of reducing the cost of other features in the group encountered after feature 123 by 90%. As discussed above, an example of such a group is a set of synchronized traffic lights which are timed such that cars leaving a light in the group when the light turns green will reach subsequent lights while they are also green.

In addition, the feature 123 has a heavy traffic cost of 90 and a heavy traffic effect that causes the group effect for the features of group 2333 to be ignored during heavy traffic (e.g. because the heavy traffic may cause the arrival of vehicles outside of the expected timing).

Finally, the feature 123, as a traffic light, is designated as active and the most recent monitoring observed that feature 123 turned red 15 seconds ago.

Feature database entry 502 indicates the feature identifier of 124 is assigned to a feature with the forced merge class. The database entry 502 is unresolved. Because the feature is a road geometry change, the active/static type flag field indicates the feature is a static feature and no timing is specified. The range of costs for the forced merge are a 15 minimum cost and a 60 maximum cost.

Feature 124 of entry 502 is indicated as not being part of a group and without a group effect. In addition, the feature 124 has a heavy traffic cost of 180 and no heavy traffic effect. Finally, the feature 124, as a static feature, is designated as not having active tracking and no current status.

Figure 6:
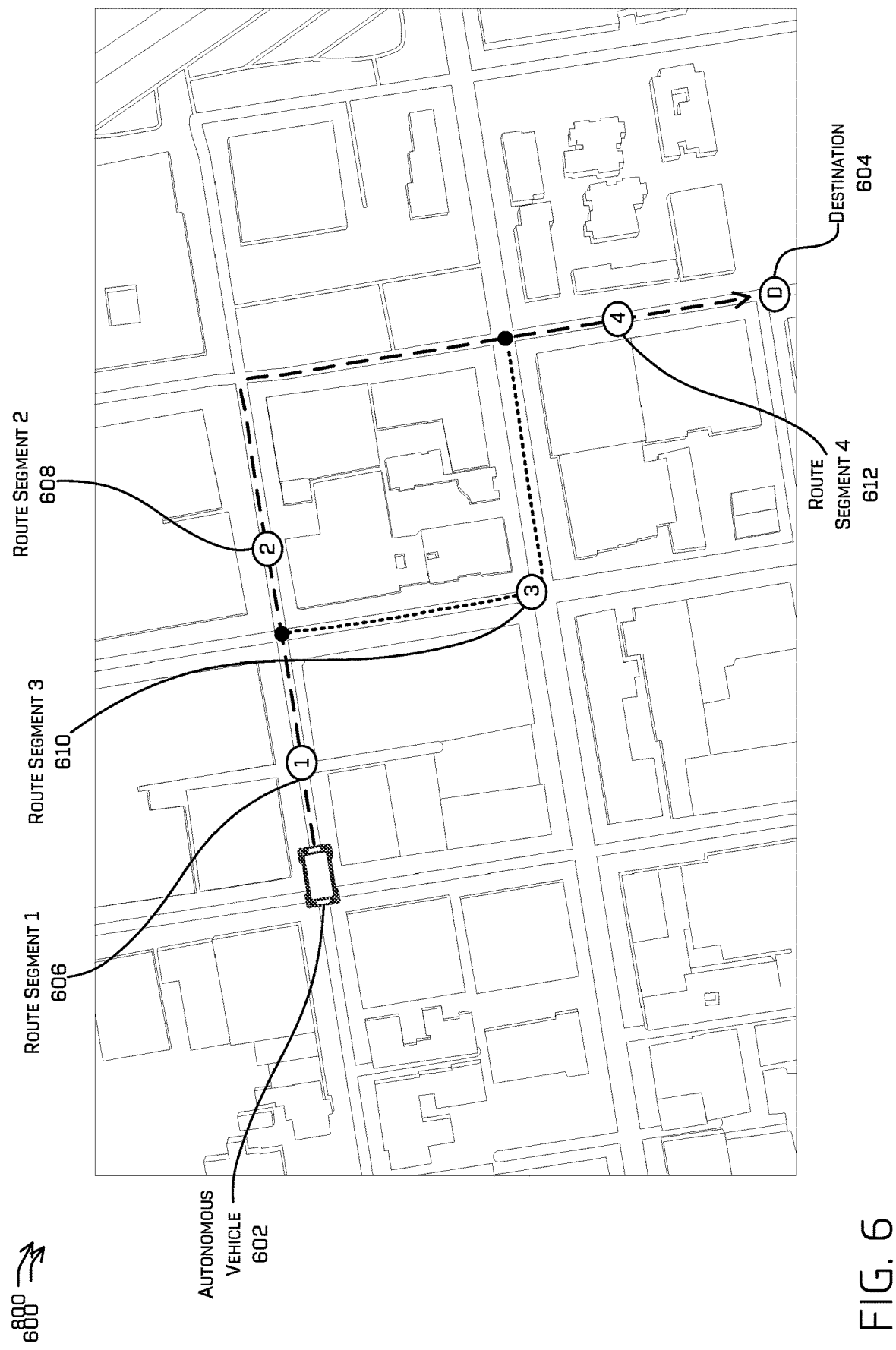
FIG. 6 illustrates a top-down view of an example vehicle traversing an example environment with segments identified along the example routes to a destination, in accordance with examples of the disclosure.

FIG. 6 illustrates an example environment in which a vehicle computing device performs feature-based route planning. More particularly, FIG. 6 illustrates an example environment 600 depicting a top-down view with a vehicle 602 performing feature-based route planning to travel to a destination ⓓ 604. The vehicle 602 can be similar to the vehicle 102 described above with reference to FIG. 1. FIG. 6 includes labeling and numbering such as ⓓ ①, ②, ③, etc. This numbering is intended to identify a destination and segments of possible routes to a destination, but is not intended to be construed as a limitation, as discussed herein As illustrated, the autonomous vehicle 602 may receive a request to travel to the destination 604. Based on the current position of the autonomous vehicle 602 and the destination 604, a route planning component may determine two possible routes to the destination. The possible routes may be segmented based on points where possible routes diverge and/or converge. As shown, the possible routes may be segmented into route segment 1 606, route segment 2 608, route segment 3 610 and route segment 4 612. More particularly, the first possible route includes route segment 1 606, route segment 2 608 and route segment 4 612 and the second possible route includes route segment 1 606, route segment 3 610 and route segment 4 612.

The feature component may then query the feature database to determine features along each segment. The feature component may determine the cost of the features for each segment. In some examples, the costs of the features may be determined based on associated feature database entries in the feature database and other factors as applicable such as traffic levels, time of day, group effects, current statuses of active features and/or other information that may be provided by the coordination component.

The feature component may determine a cost for each segment based at least in part on the costs of the features along the segment. Using the determined segment costs, costs for the possible routes may be determined. Then, a lowest cost route may be determined and selected for use by the autonomous vehicle.

Figure 7:
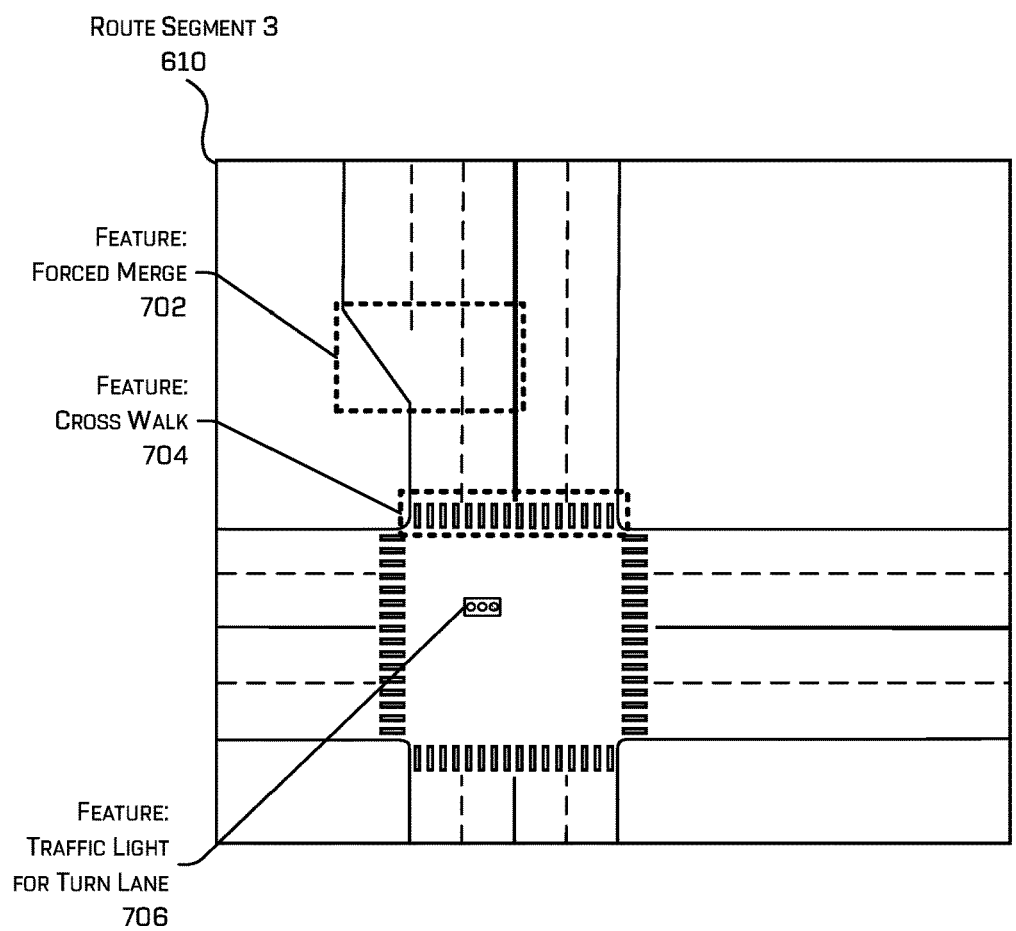
FIG. 7 illustrates a top view of an example segment of the possible routes of FIG. 6 with features identified along the example segment, in accordance with examples of the disclosure.

FIG. 7 illustrates a portion 700 of the example environment of FIG. 6. More particularly, FIG. 7 illustrates a portion of example environment 600 centered over an intersection along route segment 3 610.

As discussed above, after route segments are determined by segmenting possible routes, the feature component may query the feature database to determine features along each segment for use in determining the cost for the segment. The example illustrated in FIG. 7 shows three example features returned by the feature database. In particular, the feature database may return a forced merge feature 702, a crosswalk feature 704, and a traffic light for the turn lane feature 706. As discussed above, each feature may have a corresponding set of parameters. The feature component may determine costs for features 702-706. As discussed above, the costs of the features may be determined based on the associated feature database entries returned by the feature database and other factors as applicable such as traffic levels, time of day, group effects, current statuses of active features and/or other information that may be provided by the coordination component.

Figure 8:
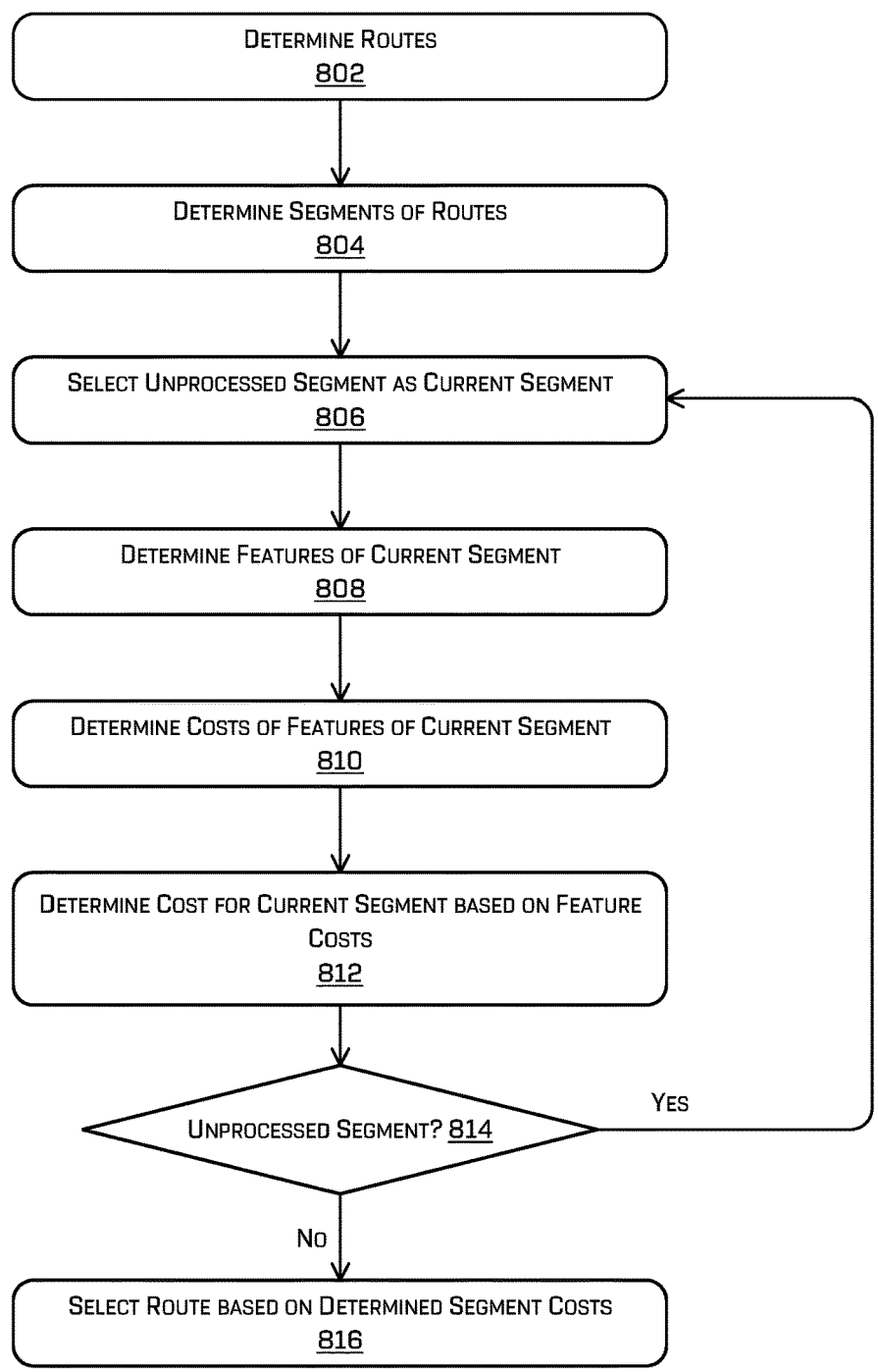
FIG. 8 illustrates a flow diagram of an example process for feature-based route planning using features in an environment, in accordance with examples of the disclosure.

FIG. 8 illustrates an example process 800 for feature-based route planning. In some examples, process 800 may be accomplished by component(s) of system 100. In some examples, the example process 800 may be performed by an onboard computer system of an autonomous vehicle 102 or may be performed in whole or in part by aspects of the computing device(s) 128.

At operation 802, the planning component may determine one or more possible routes to a destination. At operation 804, the planning component onboard the autonomous vehicle may subdivide the possible routes into segments (e.g., divide routes at each route decision point where routes diverge and/or converge along different paths).

At 806, the feature component may select an unprocessed route segment. The feature component may then query the feature database to determine features along the selected route segment at 808. At 810, the feature component may then determine the costs of the features along the selected route segment. In some examples, the costs of the features may be determined based on associated feature database entries in the feature database and other factors as applicable such as traffic levels, time of day, group effects, current statuses of active features and/or other information that may be provided by the coordination component. At 812, the planning component may determine a cost for the current segment based at least in part on the costs of the features along the current segment.

At operation 814, the planning component may determine whether any segments remain unprocessed. If not, the process may continue to 816. Otherwise, the process may return to operation 816 to select another segment to process.

At 816, the planning component may determine the costs for the possible routes as a function of the costs of the segments that make up each route. For example, a lowest cost route may be determined and selected for use by the autonomous vehicle. However, this is merely an example. While the lowest cost may be chosen, selection may be more detailed. For example, where examples use ranges of costs for features, the route with the lowest minimum cost may not always be selected. For example, a route with a wide range including a lowest minimum cost but a substantially higher maximum cost may be discarded in favor of a more "stable" route with a narrower range of costs between its minimum and maximum costs and a minimum cost that is not substantially higher than the minimum cost of the wide range route.

Note that, although the example process 800 is depicted as sequential operations, it is understood that the operations discussed herein may be performed in a different order, simultaneously, and/or by one or more devices. Further, though process 800 is described as occurring on an autonomous vehicle, implementations are not so limited. For example, in some implementations, feature-based route planning may be performed by a manually driven vehicle with an onboard computing device system that performs the operations discussed above. Moreover, in some examples, the computing devices performing the operations discussed above may not be aboard or in any way associated with a vehicle.

Figure 9:
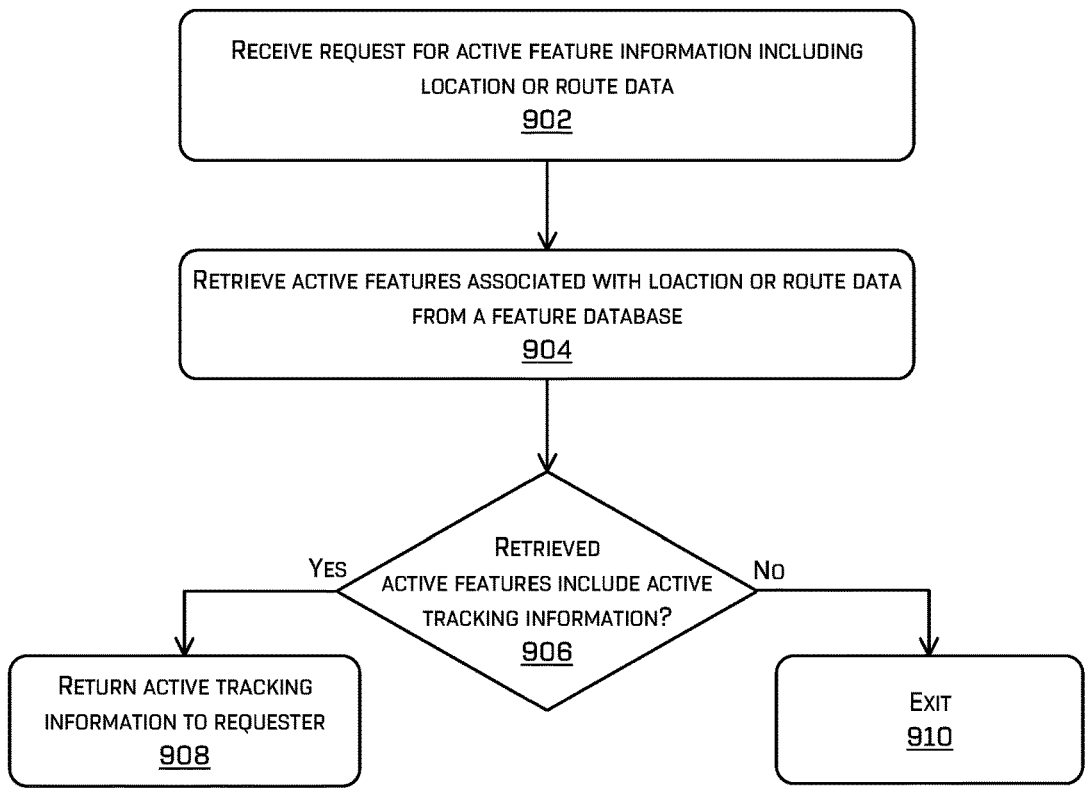
FIG. 9 illustrates a flow diagram of an example process for providing active feature information for feature-based route planning, in accordance with examples of the disclosure.

FIG. 9 illustrates an example process 900 for feature-based route planning and specifically for handling of active feature tracking. In some examples, process 900 may be accomplished by component(s) of system 100. In some examples, the example process 900 may be performed by aspects of the computing device(s) 128 or may be performed in whole or in part by an onboard computer system of an autonomous vehicle 102.

At operation 902, the coordination component of the feature database update system may receive a request for active feature information including location or route data. For example, the request may specify a location of the requester, a destination location, a geographic area or a route. At operation 904, the coordination component may retrieve active features associated with the location or route data from a feature database. For example, the coordination component may request information relating to active features associated with a location of the requester, a destination location, a geographic area or a route.

At operation 906, the coordination component may determine whether any retrieved active features include active tracking information. If so, the process may continue to 908. Otherwise, the process may continue to 910 and exit.

At 908, the coordination component may return the determined active tracking information to the requester.

Note that, although the example process 900 is depicted as sequential operations, it is understood that the operations discussed herein may be performed in a different order, simultaneously, and/or by one or more devices.

While the examples described above utilize information collected by autonomous vehicles in generating feature database entries, other sources of information may be utilized. For example, information may be collected from civic databases, publicly available data sources or private sources. Depending on the form of the data, the incorporation into the feature database may vary.

Example Clauses

A. A method comprising: receiving sensor data associated with a sensor of an autonomous vehicle; detecting a feature in the sensor data, the feature indicative of traffic-flow information associated with operation of the autonomous vehicle through an environment; determining an absence of the feature from a feature database; determining, based on the sensor data, a cost contributed by the feature to a route cost associated with a route comprising a location associated with the feature; updating, as an updated feature database, the feature database to comprise a database entry associated with the feature, the database entry comprising the cost; and transmitting at least an updated portion of the updated feature database including at least a portion of the database entry associated with the feature to one of the autonomous vehicle or another autonomous vehicle.

B. The method of clause A, wherein the feature is associated with one or more feature types of: a traffic light; a road sign; a crosswalk; a speed bump; a hill; road damage; a lane merge; an unprotected left turn; a school zone; a rail crossing; a lane restriction; a traffic inlet or outlet; a highway on-ramp or off-ramp; a passing restriction; a center of road turn lane; a civic building; a drawbridge; an industrial or technology campus; or a shopping center, and wherein determining the cost is based at least in part on one of: an amount of time to traverse a region of the environment associated with the feature; and the feature type of the feature.

C. The method of clause A, wherein the cost comprises a range from a minimum cost to a maximum cost.

D. The method of clause A, wherein the feature is a first feature, the cost is a first cost, the location is a first location and updating the feature database to comprise the database entry associated with the first feature comprises: determining a relationship between the first cost and a second cost contributed by a second feature to the route comprising the first location and a second location associated with the second feature; and determining, as a group effect, an association between the first cost and the second cost.

E. The method of clause A, wherein updating the feature database comprises indicating, in the feature database, that the feature is unresolved, the method further comprising: receiving additional sensor data from the autonomous vehicle or another vehicle in a fleet of autonomous vehicles to which the autonomous vehicle belongs; confirming, based at least in part on the additional sensor data, the existence of the feature; and updating the feature database to indicate the feature as being resolved.

F. The method of clause A, further comprising: determining that the feature is associated with a traffic light classification; wherein updating the feature database to comprise the database entry associated with the feature comprises: determining a timing associated with the feature; and associating the timing with the database entry.

G. A system comprising: one or more processors; and one or more non-transitory computer-readable media comprising processor-executable instructions that, when executed by the one or more processors, cause the system to perform operations comprising: determining that sensor data represents a feature, the feature indicative of traffic-flow information associated with operation of the autonomous vehicle through an environment; determining an absence of the feature from a feature database; determining, based at least in part on the sensor data, a cost contributed by the feature to a route cost associated with a route comprising a location associated with the feature; and updating, as an updated feature database, the feature database to comprise a database entry associated with the feature.

H. The system of clause G, wherein the feature comprises one or more of: a traffic light; a road sign; a crosswalk; a speed bump; a hill; road damage; a lane merge; an unprotected left turn; a school zone; a rail crossing; lane restriction; a traffic inlet or outlet; a highway on-ramp or off-ramp; a passing restriction; a center of road turn lane; a civic building; a drawbridge; an industrial or technology campus; or a shopping center.

I. The system of clause G, wherein the sensor data is first sensor data, the cost is a first cost, and the updated feature database is a first updated feature database, the operations further comprising: marking the database entry associated with the feature as unresolved; determining that second sensor data represents the feature; determining that the first updated feature database comprises the database entry associated with the feature; updating, as a second cost and based at least in part on the second sensor data, the first cost; determining one or more values associated with the database entry have an uncertainty less than or equal to one or more respective thresholds; marking the database entry associated with the feature as resolved based at least in part on the determining the one or more values associated with the database entry have the uncertainty less than or equal to the one or more respective thresholds; and updating, as a second updated feature database and based at least in part on the second cost, the database entry in the first updated feature database.

J. The system of clause I, wherein the first sensor data is captured by a different device than the second sensor data.

K. The system of clause G, wherein the feature is a first feature, the cost is a first cost, the location is a first location and updating the feature database to comprise the database entry comprises: determining a relationship between the first cost and a second cost contributed by a second feature to routes comprising the first location and a second location associated with the second feature; associating, as a first group, the first feature and the second feature based on the relationship.

L. The system of clause G, wherein the updating, as the updated feature database, the feature database to comprise the database entry associated with the feature further comprises determining a level of traffic associated with the route, wherein determining the cost is based at least in part on the level of traffic.

M. The system of clause G, the operations further comprising: determining that the feature is associated with a traffic light classification; wherein updating the feature database to comprise the database entry associated with the feature comprises: determining a timing associated with the feature; and associating the timing with the database entry.

N. The system of clause G, wherein: the sensor data is captured by a device associated with an autonomous vehicle; and the operations further comprise transmitting at least an updated portion of the updated feature database including at least a portion of the database entry associated with the feature to one of the autonomous vehicle and another autonomous vehicle, wherein the autonomous vehicle and the other autonomous vehicle are configured to perform routing through an environment based at least in part on the updated feature database.

O. One or more non-transitory computer-readable media storing processor-executable instructions that, when executed by one or more processors, cause the one or more processors to perform operations comprising: determining that sensor data represents a feature, the feature indicative of traffic-flow information associated with operation of the autonomous vehicle through an environment; determining an absence of the feature from a feature database; determining, based at least in part on the sensor data, a cost contributed by the feature to a route cost associated with a route comprising a location associated with the feature; and updating, as an updated feature database, the feature database to comprise a database entry associated with the feature.

P. The one or more non-transitory computer-readable media of clause O, wherein the feature comprises one or more of: a traffic light; a road sign; a crosswalk; a speed bump; a hill; road damage; a lane merge; an unprotected left turn; school zone; a rail crossing; a lane restriction; a traffic inlet or outlet; a highway on-ramp or off-ramp; a passing restriction; a center of road turn lane; a civic building; a drawbridge; an industrial or technology campus; or a shopping center.

Q. The one or more non-transitory computer-readable media of clause O, wherein the sensor data is first sensor data, the cost is a first cost, and the updated feature database is a first updated feature database, the operations further comprising: marking the database entry associated with the feature as unresolved; determining that second sensor data represents the feature; determining that the first updated feature database comprises the database entry associated with the feature; updating, as a second cost and based at least in part on the second sensor data, the first cost; determining one or more values associated with the database entry have an uncertainty less than or equal to one or more respective thresholds; marking the database entry associated with the feature as resolved based at least in part on the determining the one or more values associated with the database entry have the uncertainty less than or equal to the one or more respective thresholds; and updating, as a second updated feature database and based at least in part on the second cost, the database entry in the first updated feature database.

R. The one or more non-transitory computer-readable media of clause Q, wherein the updating, as the first updated feature database, the feature database to comprise the database entry associated with the first feature further comprises: determining a relationship between the first cost and a second cost contributed by a second feature to routes including the first location and a second location associated with the second feature; associating, as a first group, the first feature and the second feature based on the relationship.

S. The one or more non-transitory computer-readable media of clause O, further comprising: determining a heavy traffic cost contributed by the feature at a time that a level of traffic associated with the route meets or exceeds a traffic level threshold; and adding the heavy traffic cost to the database entry.

T. The one or more non-transitory computer-readable media of clause O, the operations further comprising: determining that the first feature is associated with a traffic light classification; wherein updating the feature database to comprise the database entry associated with the feature comprises: determining a timing associated with the feature; and associating the timing with the database entry.

U. A method comprising: determining a route to a destination from a current location of an autonomous vehicle; determining a segment of the route; determining a feature associated with the segment of the route; determining, based on one or more current conditions and first feature information associated with the feature, a cost contributed by the feature to costs of routes comprising a first location associated with the first feature; determining a cost of the segment of the route based at least in part on the cost of the feature; determining a cost of the route based at least in part on the cost of the segment; selecting determining the route based at least in part of the cost of the route; and determining, based at least in part on the route, a trajectory for the autonomous vehicle.

V. The method of clause U, further comprising: determining a second feature associated with the segment of the route; determining a second feature cost of the second feature along the segment of the route; and determining the cost of the segment of the route based at least in part on the second feature cost of the second feature.

W. The method of clause V, further comprising: determining that the first feature and the second feature are associated with a same group of features; and determining a group effect for the group of features; wherein the determining the cost of the feature and the determining the second feature cost of the second feature are based at least in part on the group effect.

X. The method of clause W, wherein the feature is a first traffic light, the second feature is a second traffic light, and the group effect reduces the second feature cost of the second feature when a route comprises the first feature.

Y. The method of clause U, wherein the feature is a traffic light, the method further comprising: determining timing information associated with the feature; determining a prior active status of the feature; determining a current active status of the feature based at least in part on the timing information of the feature and the prior active status of the feature; and wherein the determining the cost of the feature is based at least in part on the current active status of the feature.

Z. The method of clause U, further comprising: determining a level of traffic associated with the route, wherein determining the cost associated with the feature is based on the level of traffic.

AA. A system comprising: one or more processors; and one or more non-transitory computer-readable media storing processor-executable instructions that, when executed by the one or more processors, cause the system to perform operations comprising: determining a current location of a vehicle; receiving a destination location to which the vehicle is to travel from the current location; determining, based at least in part on the current location and the destination location, a segment; querying, based at least in part on the segment, a feature database; receiving, from the feature database and in response to the query, feature information associated with a feature of the segment, the feature indicative of semantic traffic information determined based at least in part on sensor data; and determining, based on one or more current conditions and the feature information associated with the feature, a feature cost contributed by the feature to a route cost of a route comprising a feature location associated with the feature; and determining a route from the current location to the destination location based at least in part on the feature cost.

AB. The system of clause AA, wherein the feature comprises one or more of: a traffic light; a road sign; a crosswalk; a speed bump; a hill; road damage; a lane merge; an unprotected left turn; a school zone; a rail crossing; a lane restriction; a traffic inlet or outlet; a highway on-ramp or off-ramp; a passing restriction; a center of road turn lane; a civic building; a drawbridge; an industrial or technology campus; or a shopping center.

AC. The system of clause AA, wherein the feature is a first feature, the operations further comprising: determining a second feature associated with an intermediate location associated with the route; determining a second feature cost contributed by the second feature to the route cost of the route; and determining the route cost based at least in part on the second feature cost of the second feature.

AD. The system of clause AC, the operations further comprising: identifying the first feature and the second feature as features associated with a same group of features; and determining a group effect for the group of features; wherein the determining the feature cost of the first feature and the determining the second feature cost of the second feature are based at least in part on the group effect.

AE. The system of clause AD, wherein the group effect reduces the feature cost associated with the first and second features.

AF. The system of clause AA, the operations further comprising: determining a level of traffic associated with the route; and altering the feature cost based at least in part on the level of traffic.

AG. The system of clause AA, wherein the feature is a traffic light, the operations further comprising: determining an amount of time the traffic light is in a current state; receiving timing information associated with the traffic light; and determining, based at least in part on the amount of time and the timing information, to alter the feature cost.

AH. The system of clause AA, the operations further comprising: determining timing information associated with the feature, the feature being a school zone and the timing information indicative of one or more periods of time during which travel speed is reduced in the school zone; determining a current time is during a one of the one or more periods of time during which travel speed is reduced in the school zone; wherein the determining the feature cost of the feature is based at least in part on the current time being during the one of the one or more periods of time during which travel speed is reduced in the school zone.

AI. One or more non-transitory computer-readable media storing processor-executable instructions that, when executed by one or more processors, cause the one or more processors to perform operations comprising: determining a current location of a vehicle; receiving a destination location to which the vehicle is to travel from the current location; determining, based at least in part on the current location and the destination location, a segment; querying, based at least in part on the segment, a feature database; receiving, from the feature database and in response to the query, feature information associated with a feature of the segment, the feature indicative of semantic traffic information determined based at least in part on sensor data; and determining, based on one or more current conditions and feature information associated with the feature, a feature cost contributed by the feature to a route cost of a route comprising a feature location associated with the feature; and determining a route from the current location to the destination location based at least in part on the feature cost.

AJ. The one or more non-transitory computer-readable media of clause AI, wherein the feature comprises one or more of: a traffic light; a road sign; a crosswalk; a speed bump; a hill; road damage; a lane merge; an unprotected left turn; a school zone; rail crossing; a lane restriction; a traffic inlet or outlet; a highway on-ramp or off-ramp; a passing restriction; a center of road turn lane; a civic building; a drawbridge; an industrial or technology campus; or a shopping center.

AK. The one or more non-transitory computer-readable media of clause AH, wherein the feature is a first feature, the operations further comprising: determining a second feature associated with an intermediate location associated with the route; determining a second feature cost contributed by the second feature to the route cost of the route; and determining the route cost based at least in part on the second feature cost of the second feature.

AL. The one or more non-transitory computer-readable media of clause AK, the operations further comprising: identifying that the first feature and the second feature as features associated with a same group of features; and determining a group effect for the group of features; wherein the first feature is a first traffic light, the second feature is a second traffic light, the group effect reduces the second feature cost of the second feature when a route comprises the first feature, and the determining the feature cost of the first feature and the determining the second feature cost of the second feature are based at least in part on the group effect.

AM. The one or more non-transitory computer-readable media of clause AJ, the operations further comprising: determining a level of traffic associated with the route; and altering the feature cost based at least in part on the level of traffic.

AN. The one or more non-transitory computer-readable media of clause AI, wherein the feature is a traffic light and the operations further comprising: determining an amount of time the traffic light is in a current state; receiving information associated with the traffic light; and determining, based at least in part on the amount of time and the timing information, to alter the feature cost.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving sensor data associated with a sensor of an autonomous vehicle;
   detecting a feature in the sensor data, the feature indicative of traffic-flow information associated with operation of the autonomous vehicle through an environment;
   determining an absence of the feature from a feature database;
   determining, based on the sensor data, a cost contributed by the feature determined to be absent from the feature database to a route cost associated with a route comprising a location associated with the feature;
   updating, as an updated feature database, the feature database to comprise a database entry associated with the feature, the database entry comprising the cost; and
   transmitting at least an updated portion of the updated feature database including at least a portion of the database entry associated with the feature to one of the autonomous vehicle or another autonomous vehicle, wherein the one of the autonomous vehicle or the other autonomous vehicle is configured to perform routing through the environment or another environment based at least in part on the updated feature database.

2. The method of claim 1, wherein the feature is associated with one or more feature types of:
   a traffic light;
   a road sign;
   a crosswalk;
   a speed bump;
   a hill;
   road damage;
   a lane merge;
   an unprotected left turn;
   a school zone;
   a rail crossing;
   a lane restriction;
   a traffic inlet or outlet;
   a highway on-ramp or off-ramp;
   a passing restriction;
   a center of road turn lane;
   a civic building;
   a drawbridge;
   an industrial or technology campus; or
   a shopping center, and
   wherein determining the cost is based at least in part on one of:
      an amount of time to traverse a region of the environment associated with the feature; and
      the feature type of the feature.

3. The method of claim 1, wherein the cost comprises a range from a minimum cost to a maximum cost.

4. The method of claim 1, wherein the feature is a first feature, the cost is a first cost, the location is a first location and updating the feature database to comprise the database entry associated with the first feature comprises:
   determining a relationship between the first cost and a second cost contributed by a second feature to the route comprising the first location and a second location associated with the second feature; and
   determining, as a group effect, an association between the first cost and the second cost.

5. The method of claim 1, wherein updating the feature database comprises indicating, in the feature database, that the feature is unresolved, the method further comprising:
   receiving additional sensor data from the autonomous vehicle or another vehicle in a fleet of autonomous vehicles to which the autonomous vehicle belongs;
   confirming, based at least in part on the additional sensor data, existence of the feature; and
   updating the feature database to indicate the feature as being resolved.

6. The method of claim 1, further comprising:
   determining that the feature is associated with a traffic light classification;
   wherein updating the feature database to comprise the database entry associated with the feature comprises:
      determining a timing associated with the feature; and
      associating the timing with the database entry.

7. A system comprising:
   one or more processors; and
   one or more non-transitory computer-readable media comprising processor-executable instructions that, when executed by the one or more processors, cause the system to perform operations comprising:

determining that sensor data represents a feature, the feature indicative of traffic-flow information associated with operation of an autonomous vehicle through an environment;

determining an absence of the feature from a feature database;

determining, based at least in part on the sensor data, a cost contributed by the feature determined to be absent from the feature database to a route cost associated with a route comprising a location associated with the feature;

updating, as an updated feature database, the feature database to comprise a database entry associated with the feature; and transmitting at least an updated portion of the updated feature database including at least a portion of the database entry associated with the feature to one of the autonomous vehicle and another autonomous vehicle is configured to preform routing through the environment or another based at least in part on the updated feature database.

8. The system of claim 7, wherein the feature comprises one or more of:
a traffic light;
a road sign;
a crosswalk;
a speed bump;
a hill;
road damage;
a lane merge;
an unprotected left turn;
a school zone;
a rail crossing;
a lane restriction;
a traffic inlet or outlet;
a highway on-ramp or off-ramp;
a passing restriction;
a center of road turn lane;
a civic building;
a drawbridge;
an industrial or technology campus; or
a shopping center.

9. The system of claim 7, wherein the sensor data is first sensor data, the cost is a first cost, and the updated feature database is a first updated feature database, the operations further comprising:

marking the database entry associated with the feature as unresolved;

determining that second sensor data represents the feature;

determining that the first updated feature database comprises the database entry associated with the feature;

updating, as a second cost and based at least in part on the second sensor data, the first cost;

determining one or more values associated with the database entry have an uncertainty less than or equal to one or more respective thresholds;

marking the database entry associated with the feature as resolved based at least in part on the determining the one or more values associated with the database entry have the uncertainty less than or equal to the one or more respective thresholds; and updating, as a second updated feature database and based at least in part on the second cost, the database entry in the first updated feature database.

10. The system of claim 9, wherein the first sensor data is captured by a different device than the second sensor data.

11. The system of claim 7, wherein the feature is a first feature, the cost is a first cost, the location is a first location and updating the feature database to comprise the database entry comprises:

determining a relationship between the first cost and a second cost contributed by a second feature to routes comprising the first location and a second location associated with the second feature;

associating, as a first group, the first feature and the second feature based on the relationship.

12. The system of claim 7, wherein the updating, as the updated feature database, the feature database to comprise the database entry associated with the feature further comprises determining a level of traffic associated with the route, wherein determining the cost is based at least in part on the level of traffic.

13. The system of claim 7, the operations further comprising:

determining that the feature is associated with a traffic light classification;

wherein updating the feature database to comprise the database entry associated with the feature comprises:
determining a timing associated with the feature; and
associating the timing with the database entry.

14. The system of claim 7, wherein:
the sensor data is captured by a device associated with the autonomous vehicle or the other autonomous vehicle.

15. One or more non-transitory computer-readable media storing processor-executable instructions that, when executed by one or more processors, cause the one or more processors to perform operations comprising:

determining that sensor data represents a feature, the feature indicative of traffic-flow information associated with operation of an autonomous vehicle through an environment;

determining an absence of the feature from a feature database;

determining, based at least in part on the sensor data, a cost contributed by the feature determined to be absent from the feature database to a route cost associated with a route comprising a location associated with the feature;

updating, as an updated feature database, the feature database to comprise a database entry associated with the feature; and transmitting at least an updated portion of the updated feature database including at least a portion of the database entry associated with the feature to one of the autonomous vehicle and another autonomous vehicle, wherein the one of the autonomous vehicle or the other autonomous vehicle is configured to perform routing through the environment or another based at least in part on the updated feature database.

16. The one or more non-transitory computer-readable media of claim 15,
wherein the feature comprises one or more of:
a traffic light;
a road sign;
a crosswalk;
a speed bump;
a hill;
road damage;
a lane merge;
an unprotected left turn;
a school zone;

a rail crossing;
a lane restriction;
a traffic inlet or outlet;
a highway on-ramp or off-ramp;
a passing restriction;
a drawbridge;
a center of road turn lane;
a civic building;
an industrial or technology campus; or
a shopping center.

17. The one or more non-transitory computer-readable media of claim 15, wherein the sensor data is first sensor data, the cost is a first cost, and the updated feature database is a first updated feature database, the operations further comprising:
   marking the database entry associated with the feature as unresolved;
   determining that second sensor data represents the feature;
   determining that the first updated feature database comprises the database entry associated with the feature;
   updating, as a second cost and based at least in part on the second sensor data, the first cost;
   determining one or more values associated with the database entry have an uncertainty less than or equal to one or more respective thresholds;
   marking the database entry associated with the feature as resolved based at least in part on the determining the one or more values associated with the database entry have the uncertainty less than or equal to the one or more respective thresholds; and
   updating, as a second updated feature database and based at least in part on the second cost, the database entry in the first updated feature database.

18. The one or more non-transitory computer-readable media of claim 15, wherein the feature is a first feature, the cost is a first cost, the location is a first location and the updating, as the updated feature database, the feature database to comprise the database entry associated with the first feature further comprises:
   determining a relationship between the first cost and a second cost contributed by a second feature to routes including the first location and a second location associated with the second feature;
   associating, as a first group, the first feature and the second feature based on the relationship.

19. The one or more non-transitory computer-readable media of claim 15, further comprising:
   determining a heavy traffic cost contributed by the feature at a time that a level of traffic associated with the route meets or exceeds a traffic level threshold; and
   adding the heavy traffic cost to the database entry.

20. The one or more non-transitory computer-readable media of claim 15, the operations further comprising:
   determining that the feature is associated with a traffic light classification;
   wherein updating the feature database to comprise the database entry associated with the feature comprises:
   determining a timing associated with the feature; and
   associating the timing with the database entry.

* * * * *

UNITED STATES PATENT AND TRADEMARK OFFICE
CERTIFICATE OF CORRECTION

PATENT NO. : 11,566,912 B1
APPLICATION NO. : 16/904733
DATED : January 31, 2023
INVENTOR(S) : Taylor Andrew Arnicar et al.

It is certified that error appears in the above-identified patent and that said Letters Patent is hereby corrected as shown below:

In the Claims

Column 31, Line 21, change "preform" to "perform"

Signed and Sealed this
Twenty-eighth Day of March, 2023

Katherine Kelly Vidal
*Director of the United States Patent and Trademark Office*